United States Patent
Kobayashi et al.

(10) Patent No.: US 10,551,080 B2
(45) Date of Patent: Feb. 4, 2020

(54) HOUSEHOLD ELECTRICAL APPLIANCE AND HOUSEHOLD ELECTRICAL SYSTEM

(71) Applicant: Panasonic Intellectual Property Management Co., Ltd., Osaka-shi, Osaka (JP)

(72) Inventors: Takayuki Kobayashi, Kyoto (JP); Takehiko Nitta, Kyoto (JP); Hirokazu Kamoda, Shiga (JP); Jun Akiyama, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 200 days.

(21) Appl. No.: 15/432,508

(22) Filed: Feb. 14, 2017

(65) Prior Publication Data
US 2017/0153036 A1    Jun. 1, 2017

Related U.S. Application Data

(62) Division of application No. 14/419,636, filed as application No. PCT/JP2013/004678 on Aug. 1, 2013, now Pat. No. 9,791,162.

(30) Foreign Application Priority Data

Aug. 8, 2012  (JP) .................. 2012-176197
Aug. 8, 2012  (JP) .................. 2012-176198

(51) Int. Cl.
*F24F 11/30* (2018.01)
*F24F 11/62* (2018.01)
(Continued)

(52) U.S. Cl.
CPC .............. *F24F 11/30* (2018.01); *F24F 3/065* (2013.01); *F24F 5/0096* (2013.01); *F24F 11/62* (2018.01);
(Continued)

(58) Field of Classification Search
CPC .. F24F 11/30; F24F 11/46; F24F 11/62; F24F 3/065; F24F 5/0096; F24F 11/56;
(Continued)

(56) References Cited

U.S. PATENT DOCUMENTS

2001/0010032 A1    7/2001  Ehlers et al.
2007/0043478 A1    2/2007  Ehlers et al.
(Continued)

FOREIGN PATENT DOCUMENTS

CN    1566824    1/2005
CN    1621758    6/2005
(Continued)

OTHER PUBLICATIONS

Office Action issued in Japanese patent application No. 2016-210762, dated Aug. 22, 2017, 4 pages provided.
(Continued)

*Primary Examiner* — Ziaul Karim
(74) *Attorney, Agent, or Firm* — Hamre, Schumann, Mueller & Larson, P.C.

(57) ABSTRACT

A household electric appliance and a household electric system are provided which are capable of quickly responding to the electric power demand in which the peak cut of the power consumption is requested. The household electric appliance comprises: a receiving unit that receives a request for a peak cut of power consumption at a predetermined rate from a remote controller and a mobile terminal; a drive unit that drives a power-consuming object to be driven; and a control unit that controls an action of the drive unit. The control unit, in the case of reception of the peak cut request from the remote controller or the mobile terminal, controls the action of the drive unit so as to cut a maximum value of the power consumption within the appliance based on the requested rate.

5 Claims, 15 Drawing Sheets

(51) Int. Cl.
| | |
|---|---|
| *F24F 3/06* | (2006.01) |
| *F24F 5/00* | (2006.01) |
| *G08C 17/02* | (2006.01) |
| *G05B 15/02* | (2006.01) |
| *H02J 3/14* | (2006.01) |
| *G05B 19/048* | (2006.01) |
| *F24F 11/46* | (2018.01) |
| *F24F 140/60* | (2018.01) |
| *F24F 140/50* | (2018.01) |
| *F24F 11/65* | (2018.01) |
| *F24F 11/56* | (2018.01) |
| *F24F 110/10* | (2018.01) |

(52) U.S. Cl.
CPC ........... *G05B 15/02* (2013.01); *G05B 19/048* (2013.01); *G08C 17/02* (2013.01); *H02J 3/14* (2013.01); *F24F 11/46* (2018.01); *F24F 11/56* (2018.01); *F24F 11/65* (2018.01); *F24F 2110/10* (2018.01); *F24F 2140/50* (2018.01); *F24F 2140/60* (2018.01); *G05B 2219/2614* (2013.01); *G05B 2219/2642* (2013.01); *G08C 2201/93* (2013.01); *H02J 2003/143* (2013.01); *Y02B 70/3225* (2013.01); *Y02B 70/3241* (2013.01); *Y02B 70/3266* (2013.01); *Y02B 70/3275* (2013.01); *Y04S 20/222* (2013.01); *Y04S 20/224* (2013.01); *Y04S 20/227* (2013.01); *Y04S 20/242* (2013.01); *Y04S 20/244* (2013.01)

(58) Field of Classification Search
CPC .... F24F 2140/60; F24F 2140/50; F24F 11/65; F24F 2110/10; G05B 2219/2642; G05B 19/048; G05B 15/02; G05B 2219/2614; H02J 2003/143; H02J 3/14; G08C 2201/93; G08C 17/02; Y04S 20/244; Y04S 20/242; Y04S 20/227; Y04S 20/224; Y04S 20/222; Y02B 70/3266; Y02B 70/3275; Y02B 70/3225; Y02B 70/3241
USPC .................................................. 700/276–286
See application file for complete search history.

(56) References Cited

U.S. PATENT DOCUMENTS

| | | | |
|---|---|---|---|
| 2007/0137225 A1 | 6/2007 | Shindo et al. | |
| 2008/0281472 A1* | 11/2008 | Podgorny | G05B 15/02 700/276 |
| 2009/0140060 A1* | 6/2009 | Stoner | G05D 23/1934 236/51 |
| 2010/0085144 A1* | 4/2010 | Aisa | G05B 19/0423 340/3.1 |
| 2010/0174668 A1 | 7/2010 | Finch et al. | |
| 2010/0286841 A1 | 11/2010 | Subbloie | |
| 2010/0289643 A1* | 11/2010 | Trundle | G08C 19/16 340/545.1 |
| 2010/0327766 A1 | 12/2010 | Recker et al. | |
| 2011/0114627 A1 | 5/2011 | Burt | |
| 2011/0172841 A1* | 7/2011 | Forbes, Jr. | G01D 4/004 700/292 |
| 2015/0160675 A1 | 6/2015 | Kim et al. | |

FOREIGN PATENT DOCUMENTS

| | | |
|---|---|---|
| CN | 101256017 A | 9/2008 |
| CN | 101865513 | 10/2010 |
| CN | 102052736 | 5/2011 |
| CN | 102193510 | 9/2011 |
| EP | 1536186 | 6/2005 |
| JP | S60129544 | 7/1985 |
| JP | 2002048384 A | 2/2002 |
| JP | 2003009256 A | 1/2003 |
| JP | 2003106603 | 4/2003 |
| JP | 2004077063 | 3/2004 |
| JP | 2007170686 A | 7/2007 |
| JP | 2010175098 | 8/2010 |
| JP | 2011133167 | 7/2011 |
| JP | 2012016248 | 1/2012 |

OTHER PUBLICATIONS

International Preliminary Report on Patentability and Written Opinion, dated Feb. 2015; PCT/JP2013/004678 (12 pages).
Supplemental European Search report issued in counterpart European Patent Application No. 13827251.3, dated Nov. 3, 2015 (7 pages).
Office Action issued in Chinese Patent Application No. 201380042059.0, with English translation of the front page of the Office Action and the Search Report; dated Oct. 10, 2016, total 14 pages.
Office Action and Search Report (English and Chinese) issued in CN201380042059.0, dated May 24, 2017, 10 pages povided.
Official Communication issued in European Patent Application No. 13827251.3 dated Oct. 6, 2017.
Office Action issued in U.S. Appl. No. 14/419,636, dated Jan. 27, 2017, 12 pages provided.

* cited by examiner

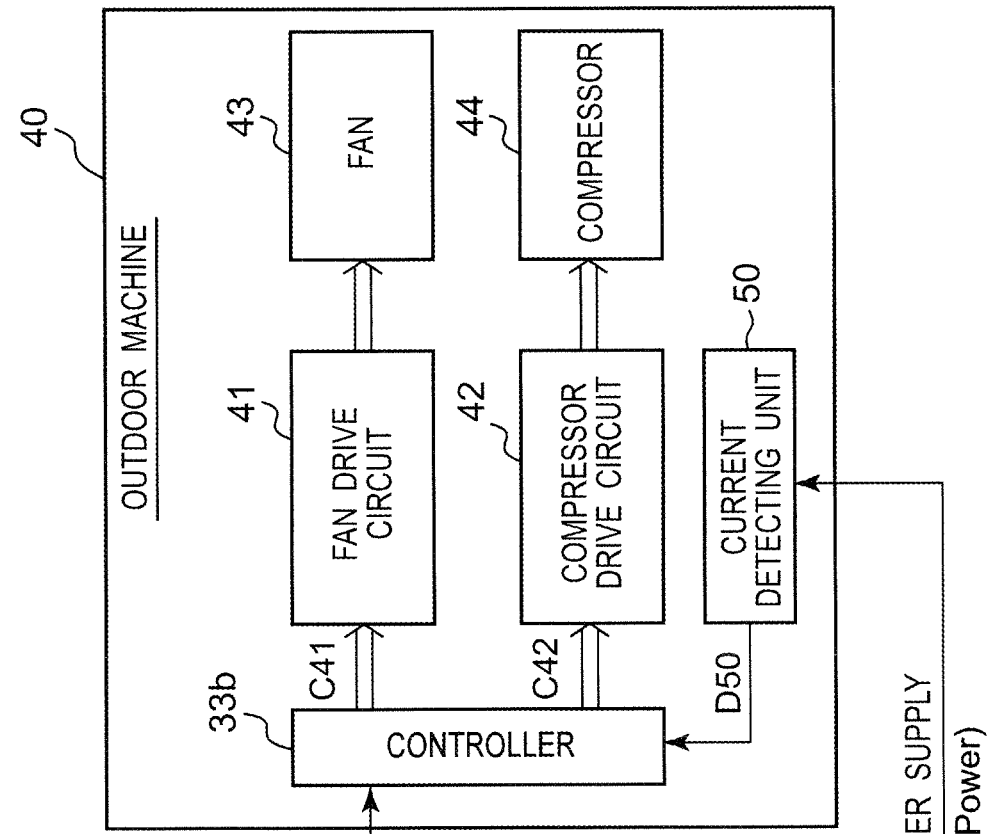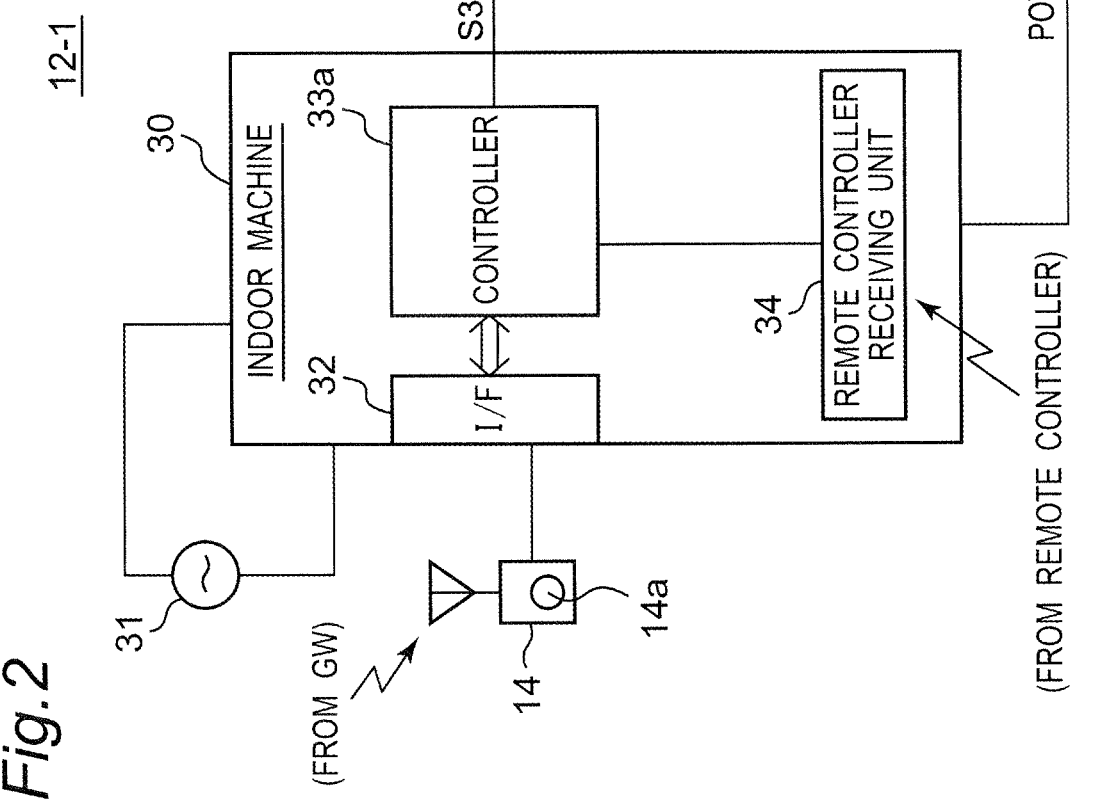
Fig.2

SETTING OF POWER CONSUMPTION PEAK CUT

DETERMINATION FLOW OF POWER CONSUMPTION PEAK CUT

|   | SETTING BY MAIN BODY REMOTE CONTROLLER (POWER SAVING MODE) | SETTING BY SMART PHONE |
|---|---|---|
| COOLING | 100% · 85% | 100% · 85%<br>75% · 50% |
| HEATING | 100% · 75% | 100% · 85%<br>75% · 50% |

SETTING OF ECO-KEEPING OPERATION ACTION

16a

WHEN SET TEMPERATURE RANGE IS 23°C TO 28°C

|  | ROOM TEMPERATURE > SET UPPER-LIMIT TEMPERATURE (28°C) | ROOM TEMPERATURE < SET LOWER-LIMIT TEMPERATURE (23°C) |
|---|---|---|
| OPERATION MODE | COOLING | HEATING |
| MAIN BODY SETTING TEMPERATURE | 27°C | 24°C |
| AIR VOLUME | AUTOMATIC | AUTOMATIC |
| WIND DIRECTION | AUTOMATIC | AUTOMATIC |

TEMPERATURE CONTROL 1-1 (IN SUMMER, WHEN COOLING OPERATION HAS BEEN STOPPED)

TEMPERATURE CONTROL 1-2 (IN SUMMER, WHEN COOLING OPERATION HAS BEEN IN OPERATION)

TEMPERATURE CONTROL 2-1 (IN WINTER, WHEN HEATING OPERATION HAS BEEN STOPPED)

TEMPERATURE CONTROL 2-2 (IN WINTER, WHEN HEATING OPERATION HAS BEEN IN OPERATION)

Fig. 21 THIRD EMBODIMENT

| RECEIVED SIGNAL (FROM REMOTE CONTROLLER OR MOBILE TERMINAL) | AIR-CONDITIONER ACTION | NOTE |
|---|---|---|
| (A) KEEPING OPERATION RELEASE SIGNAL | KEEPING OPERATION → KEEPING OPERATION OFF → STOP → Time (t1) | IN VIEW OF SAFETY, ACTION FOR RELEASE RESULTS IN "STOP". ※SIGNAL COMES FROM OUTDOOR. DETERMINATION BASED ON OPERATION BEFORE KEEPING OPERATION OR MODE DURING KEEPING OPERATION LEADS TO DANGER, DUE TO INCONSISTENCY OF OPERATION AFTER RELEASE. |
| (B) OPERATION SIGNAL FROM MAIN BODY REMOTE CONTROLLER OR SMART PHONE (INCLUDING ALL SUCH AS WIND DIRECTION AND AIR VOLUME) | KEEPING OPERATION → OPERATION SIGNAL FROM MAIN BODY REMOTE CONTROLLER OR SMART PHONE → STOP → Time (t1) | AT RECEIVING SIGNAL, KEEPING OPERATION IS RELEASED AND OPERATION BASED ON RECEIVED DATA IS PERFORMED. |
| (C) STOP SIGNAL FROM MAIN BODY REMOTE CONTROLLER OR SMART PHONE | KEEPING OPERATION → STOP SIGNAL FROM MAIN BODY REMOTE CONTROLLER OR SMART PHONE → STOP → Time (t1) | |
| (D) TURNING-ON TIMER SIGNAL | KEEPING OPERATION → TURNING-ON TIMER SIGNAL → STOP → Time (t1) | OPERATION BASED ON TURNING-ON OR -OFF TIMER SIGNAL IS PERFORMED. |
| (E) TURNING-OFF TIMER SIGNAL | KEEPING OPERATION → TURNING-OFF TIMER SIGNAL → STOP → Time (t1) | |
| (F) EMERGENCY OPERATION SWITCH SIGNAL (WHEN KEEPING OPERATION HAS STOPPED) | KEEPING OPERATION → EMERGENCY OPERATION SWITCH SIGNAL → STOP → Time (t1) | EMERGENCY OPERATION SWITCH SHOULD BE OPERATED BY USER AT AIR-CONDITIONER. ⇒ BASED ON MODE OF KEEPING OPERATION, OPERATING OR STOPPING IS DETERMINED. |
| (G) EMERGENCY OPERATION SWITCH SIGNAL (WHEN KEEPING OPERATION HAS BEEN IN OPERATION) | KEEPING OPERATION → EMERGENCY OPERATION SWITCH SIGNAL → STOP → Time (t1) | |

(IT IS ASSUMED THAT, DURING KEEPING OPERATION, OPERATION CHANGE SIGNAL (INCLUDING ALL SUCH AS MODE, TEMPERATURE, WIND DIRECTION AND STOP) FROM MAIN BODY REMOTE CONTROLLER OR MOBILE TERMINAL. THEN, KEEPING OPERATION IS RELEASED, AND NEW OPERATION BASED ON RECEIVED SIGNAL IS PERFORMED (TECHNOLOGICAL THOUGHT OF LATER DEPRESSING PRIORITY).)

HOUSEHOLD ELECTRICAL APPLIANCE AND HOUSEHOLD ELECTRICAL SYSTEM

TECHNICAL FIELD

The present invention is related to a household electric appliance and a household electric system.

BACKGROUND ART

Conventionally, various household electric appliances and household electric systems have been proposed that are intended to reduce power consumption as much as possible.

For example, Patent Document 1 discloses a peak electric power cut system that, using a network, controls to cause a set temperature to be shifted up in an air-conditioner in a remote location, thereby reducing power consumption. Patent Document 2 discloses the air-conditioner that sets an upper-limit temperature and a lower-limit temperature of a temperature range.

PRIOR ART DOCUMENT

Patent Document

Patent Document 1: JP2003-106603A
Patent Document 2: JP S60-129544A

SUMMARY OF THE INVENTION

Problem to be Solved by the Invention

One non-limiting and exemplary embodiment provides a household electric appliance and a household electric system that quickly respond to an electric power demand in which a peak cut of power consumption is requested and furthermore reduce the power consumption while controlling an output, for example, an output temperature.

Means for Solving the Problem

In one embodiment, a household electric appliance comprises: a receiving unit that receives a request for a peak cut of power consumption at a predetermined rate from a remote controller and a mobile terminal; a drive unit that drives a power-consuming object to be driven; and a control unit that controls an action of the drive unit. The control unit, in the case of reception of the peak cut request from the remote controller or the mobile terminal, controls the action of the drive unit so as to cut a maximum value of the power consumption within the appliance based on the requested rate.

Additionally, in other embodiment, a household electric appliance comprises: a receiving unit that receives a setting signal to set a predetermined air-conditioning operation with an upper-limit temperature and a lower-limit temperature of a room temperature set; a drive unit that drives an object to be driven to regulate the room temperature; and a control unit that controls an action of the drive unit. The control unit, in the case of reception of the setting signal to set the predetermined air-conditioning operation, controls the drive unit to perform the predetermined air-conditioning operation so that the room temperature will be the temperature within a temperature range that is lower by a predetermined temperature than the upper-limit temperature and that is higher by a predetermined temperature than the lower-limit temperature, in the predetermined air-conditioning operation.

Effect of the Invention

The above aspect can provide the household electric appliance and the household electric system capable of reducing the power consumption while appropriately controlling the output (e.g., output temperature) and further capable of quickly responding to the electric power demand in which the peak cut of the power consumption is requested.

BRIEF DESCRIPTION OF DRAWINGS

FIG. 2 is a diagram of a configuration of an air-conditioner according to the first embodiment;

FIG. 21 is a diagram of a relationship between a received signal and the operation of a household electric appliance in a third embodiment.

MODE FOR CARRYING OUT THE INVENTION

First Embodiment

Conventional Art Documents (e.g., Patent Document 1) disclose a peak electric power cut system that operates a household electric appliance such as an air-conditioner, using a network. The peak electric power cut system of Patent Document 1 controls, by way of the network, the air-conditioner owned by a customer who signed a contract with an electric power company regarding the peak electric power cut so that a set temperature will be shifted up, thereby lowering power consumption.

The control of shifting up the set temperature of the air-conditioner, however, is not directly related to actual power consumption. For this reason, it is not clear actually how much of the power consumption in the peak electric power can be cut or could be cut by such a control. For this reason, regarding electric power demands, even if a quick peak cut of the power consumption is requested, the peak electric power cut system disclosed in Patent Document 1 cannot respond promptly.

In light of the above problem, one non-limiting and exemplary embodiment of the household electric appliance and a household electric system according to a first embodiment is configured to promptly respond to the electric power demand in which the peak cut of the power consumption is requested.

The household electric system according to the first embodiment will now be described with reference to FIGS. 1 to 8. In the following, description will be made citing the household electric system having at least the air-conditioner as the household electric appliance. The household electric system according to the first embodiment is not limited to the one having the air-conditioner but may be the one having other household electric appliances of, for example, a refrigerator, a rice cooker, a washing machine, etc.

1-1 Configuration 1-1-1 Configuration of Household Electric System

Figure 1:
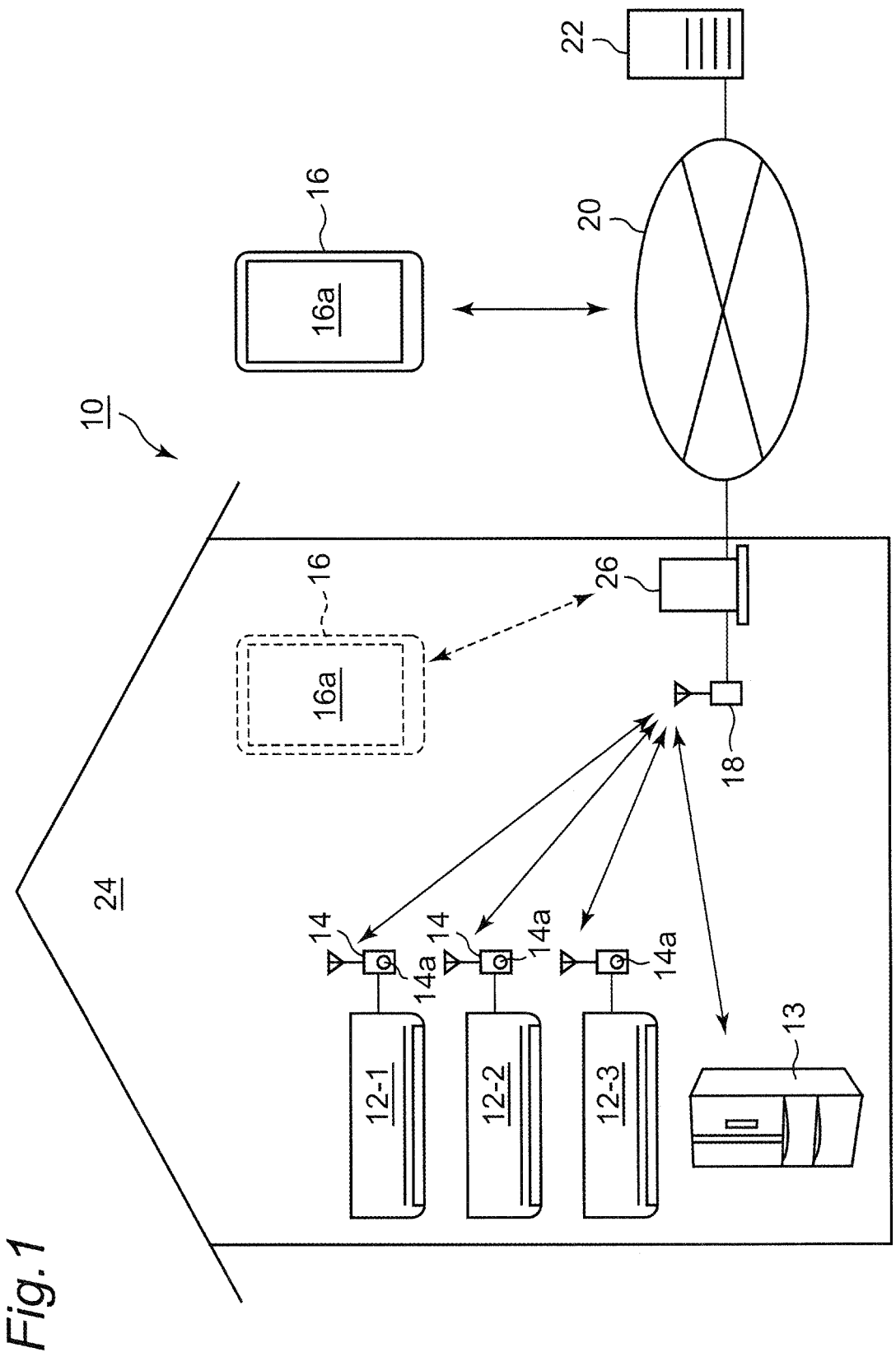
FIG. 1 is a diagram of a household electric system according to a first embodiment.

A configuration will now be described of the household electric system according to the first embodiment with reference to FIG. 1. As shown in FIG. 1, a household electric system 10 is a system to control a plurality of household electric appliances by a mobile terminal 16, etc. This embodiment includes three air-conditioners 12-1 to 12-3 and a refrigerator 13 as the plurality of household electric appliances.

The household electric system 10 according to the first embodiment has the air-conditioners 12-1 to 12-3, the refrigerator 13, a radio adaptor (communication device) 14, a mobile terminal 16, a gateway device (relay device) 18, a router device 26, the Internet 20, and a server device 22.

In the first embodiment shown in FIG. 1, three units of the air-conditioners 12-1 to 12-3 are arranged inside a user's house 24. Three units of the air-conditioners 12-1 to 12-3 are arranged, for example, in different rooms inside the house 24. Likewise, the refrigerator 13 is arranged inside the house 24.

The radio adaptor (communication device) 14, arranged to be electrically connected to a control unit of each of the air-conditioners 12-1 to 12-3, communicates with the gateway device 18. The radio adaptor 14 receives an operation signal to operate the air-conditioners 12-1 to 12-3 transmitted from the gateway device 18 and outputs the received operation signal to the control units of the air-conditioners 12-1 to 12-3. Based on this operation signal, the air-conditioners 12-1 to 12-3 perform a corresponding operation.

The radio adaptor 14 acquires identification information (e.g., manufacturing serial number, model number, etc.) of the air-conditioners 12-1 to 12-3 from the control unit of the air-conditioners 12-1 to 12-3 and transmits the information to the gateway device 18. The radio adaptor 14 may be disposed integrally with the air-conditioners 12-1 to 12-3. The radio adaptor 14 may be disposed to be attachable and detachable to and from the air-conditioners 12-1 to 12-3 so that the radio adaptor 14 can be connected to any of a plurality of air-conditioners 12-1 to 12-3. The refrigerator 13 according to the first embodiment communicates with the gateway device 18 by, for example, an integrated radio adaptor (not shown) incorporated in the main body of the refrigerator 13. The control unit will be described later of each of the air-conditioners 12-1 to 12-3.

Each radio adaptor 14 has a "connection" button 14a. The "connection" button 14a is a button for newly connecting individual radio adaptor 14 to the gateway device 18. When the "connection" button 14a is operated by the user, the radio adaptor 14 equipped with the "connection" button 14a acquires the identification information of the air-conditioners 12-1 to 12-3 from the control unit of the air-conditioners 12-1 to 12-3. The identification information is, for example, the manufacturing serial number or the model number. The radio adaptor 14 transmits the acquired identification information to the gateway device 18.

The mobile terminal 16 is a general-purpose portable terminal such as a smartphone and a tablet PC (personal computer). The mobile terminal 16 has a connection means of connecting with the Internet 20 and a communication means of communicating with the router device 26. The mobile terminal 16 (e.g., smartphone) can connect with the Internet 20 by way of a telephone network (e.g., 3G network).

The mobile terminal 16 can connect with the router device 26 and the household electric appliances by, for example, a Wi-Fi communication, a Bluetooth (registered trademark) communication, or an infrared communication, etc. In this case, a device for such a purpose (e.g., Wi-Fi antenna, etc.) is incorporated in the mobile terminal 16.

The router device 26 can communicate with the mobile terminal 16 by, for example, the Wi-Fi communication, etc. The router device 26 can communicate with the air-conditioners 12-1 to 12-3 and the refrigerator 13 by the router device 26 sending, by way of the gateway device (relay device) 18, a radio signal of a command, etc., received from the mobile terminal 16, and by the radio adaptor 14 receiving the signal. In the example shown in FIG. 1, the radio adaptor is built in the refrigerator 13. Thus, the mobile terminal 16 can directly communicate with the household electric appliances of the air-conditioners 12-1 to 12-3, etc., inside the house 24.

As described above, the gateway device (relay device) 18 relays the communication between the radio adaptor 14 and the router device 26. The gateway device 18 is installed inside the user's house 24. The gateway device 18 communicates with the radio adaptor 14, using, for example, a signal of a special small-scale frequency band (924.0 to 928.0 MHz) of the specified low power radio. The frequency band of the communication between the gateway device 18 and the radio adaptor 14 should preferably be a low frequency band that reaches up to a long distance.

The mobile terminal 16 and the server device 22 can connect with the Internet 20. Connected with the Internet 20, the mobile terminal 16 can acquire, for example, an application program to operate the air-conditioners 12-1 to 12-3 from the server device 22 by way of the Internet 20. This server device 22 is set up by a manufacturer of the air-conditioners 12-1 to 12-3 and, for example, builds a homepage of the manufacturer. Accordingly, an operator of the mobile terminal 16 operates the manufacturer's homepage to take the application program into the mobile terminal 16.

As described above, installing of the acquired application program in the mobile terminal 16 and starting of the installed program make it possible for the mobile terminal 16 to operate the air-conditioners 12-1 to 12-3. Namely, the operation of an operation screen of a touch panel 16a of the mobile terminal 16 makes it possible to generate and transmit the operation signal to operate the air-conditioners 12-1 to 12-3. The operation of the touch panel 16a of the mobile terminal 16, the generation of the operation signal, and the transmission of the operation signal will be described later.

The server device 22 controls information, etc., necessary for an access and a verification with respect to the mobile terminal 16, the air-conditioners 12-1 to 12-3, the radio adaptor 14, and the gateway device 18. For example, the server device 22 verifies (determines) whether the identification information of the mobile terminal 16 itself contained in a communication request signal from the mobile terminal 16 and the identification information of the mobile terminal 16 stored (registered) in the gateway device 18 match. If these match, then the server device 22 verifies the mobile terminal 16 making the communication request (trying to access) as a legitimate mobile terminal, permitting its communication with the household electric appliance inside the house 24.

Thus, the mobile terminal 16, outside the house 24, accesses the server device 22 by way of the Internet 20. With the verification by the server device 22, the mobile terminal 16 can indirectly communicate with the household electric appliances of the air-conditioners 12-1 to 12-3, etc., by way of the router device 26 and the gateway device 18. The mobile terminal 16 can also communicate directly with the household electric appliances of the air-conditioners 12-1 to 12-3, etc., by way of the router device 26 and the gateway device 18, inside the house 24. In this case, the mobile terminal 16 does not access the server device 22 from the Internet 20.

1-1-2 Configuration of Air-Conditioner

The configuration will then be described of the air-conditioner according to the first embodiment with reference to FIG. 2. The air-conditioner 12-1 in FIG. 1 is cited as an example. The configuration related with the refrigerating cycle is omitted in FIG. 2.

As shown in FIG. 2, the air-conditioner 12-1 according to the first embodiment is composed of an indoor machine 30 and an outdoor machine 40. For example, the indoor machine 30 is arranged inside the house 24 and the outdoor machine 40 is arranged outside the house 24.

The indoor machine 30 has an interface 32, a controller 33a, and a remote controller receiving unit 34. The indoor machine 30 is supplied with power from, for example, a commercial power source 31 inside the house 24.

The interface (I/F) 32 performs exchange of data, etc., between the radio adaptor 14 and the air-conditioner 12-1 (controller 33a).

The controller (control unit) 33a controls an overall operation of the indoor machine 30. The controller 33a, for example, upon reception of the operation signal from the mobile terminal 16 by way of the gateway device 18 and the radio adaptor 14, transmits the received operation signal S33 to a controller 33b of the outdoor machine 40.

The remote controller receiving unit 34 receives a remote controller operation signal from a main body remote controller of this air-conditioner 12-1 and transmits the signal to the controller 33a. The controller 33a in reception of the remote controller operation signal from the main body remote controller controls the operation of the air-conditioner 12-1 including the indoor machine 30, depending on the operation signal.

The outdoor machine 40 has the controller 33b, a fan drive circuit 41, a compressor drive circuit 42, a fan 43, a compressor 44, and a current detecting unit 50. The outdoor machine 40 is supplied with power from the indoor machine 30. The air-conditioner 12-1 according to the first embodiment is an indoor-power-source type air-conditioner that supplies power from the indoor machine 30 to the outdoor machine 40. The air-conditioner is not limited to the one of the indoor-power-source type but may be the one of an outdoor-power-source type that supplies power from the outdoor machine 40 to the indoor machine 30.

The controller (control unit) 33b controls the operation of the outdoor machine 40, depending on an instruction signal transmitted from the controller 33a of the indoor machine 30.

One case is assumed in which a power consumption peak cut operation is set, depending on the operation signal S33 transmitted from the controller 33a, in the controller 33b. In this case, the situation is assumed in which a current detection value detected at the current detecting unit 50 is greater than a predetermined setting value. Then, the controller 33b transmits to the compressor drive circuit 42 a control signal C42 to control the compressor drive circuit 42 to reduce the number of rotation of the compressor 44. Details of these matters will be described later.

The fan drive circuit 41 receives a control signal C41 from the controller 33b and controls the drive of the fan 43 in respect of the number of rotations, etc.

The compressor (compressing machine) drive circuit 42 receives the control signal C42 from the controller 33b to control the drive of the compressor (compressing machine) 44.

The fan 43 operates under control of the fan drive circuit 41 and generates airflow to radiate or absorb heat of refrigerant in an outdoor heat exchanger (not shown).

The compressor (compressing machine) 44, under control of the compressor drive circuit 42, compresses the refrigerant (not shown) circulating inside the air-conditioner 12-1.

The current detecting unit 50, arranged in the outdoor machine 40, detects a current value of a current path for the electric power to be supplied from the indoor machine 30 to the outdoor machine 40. The current detecting unit 50 compares the detected current value and the setting value (threshold) and transmits a detection signal D50 indicative of results of the comparison to the controller 33b. The current detecting unit 50 may be arranged in the indoor machine 30 or other location.

1-2 Power Consumption Peak Cut Operation

The operation will then be described of the power consumption peak cut in the household electric appliance according to the first embodiment.

1-2-1 Setting of Power Consumption Peak Cut

Figure 3:
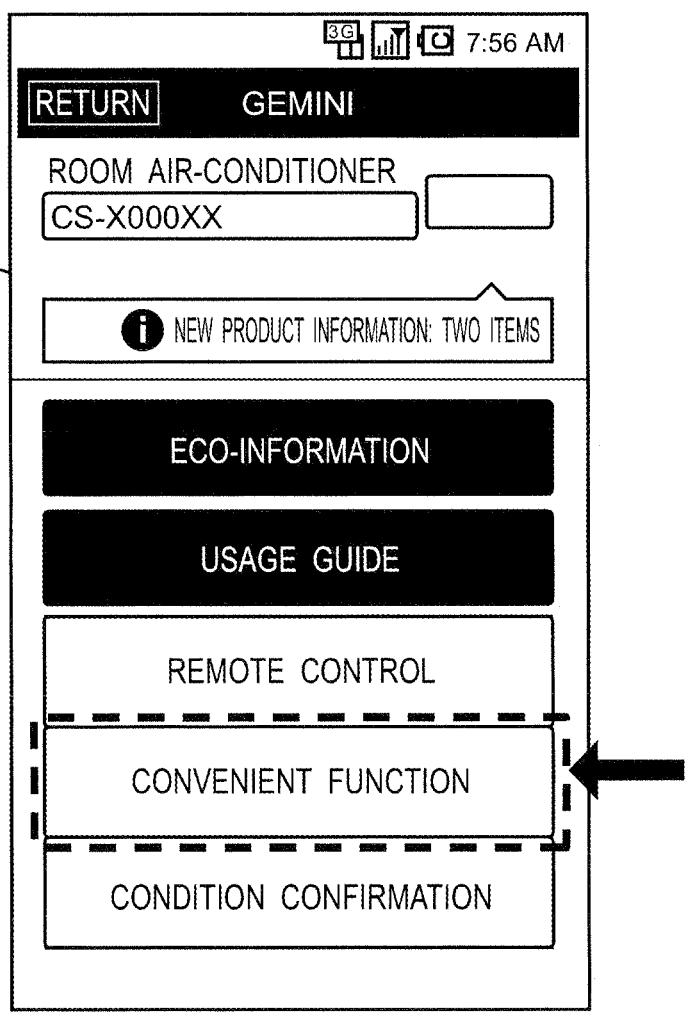
FIG. 3 is a diagram of a screen of a mobile terminal related to a setting of power consumption of the air-conditioner according to the first embodiment.

Setting will be described of the power consumption peak cut in the household electric appliance according to the first embodiment with reference to FIGS. 3 to 5. In the following, the setting by way of the touch panel 16a of the mobile terminal 16 is cited as an example. It is assumed that the mobile terminal 16 in this example is the smartphone, etc., having the touch panel 16a and that an operation program for the air-conditioner 12-1 is already installed therein from the server device 22 and started.

When the operation program of the air-conditioner 12-1 (room air-conditioner, model number: CS-X00XX) is started, such a screen as shown in FIG. 3 is displayed on a display unit 16a of the mobile terminal 16.

Figure 4:
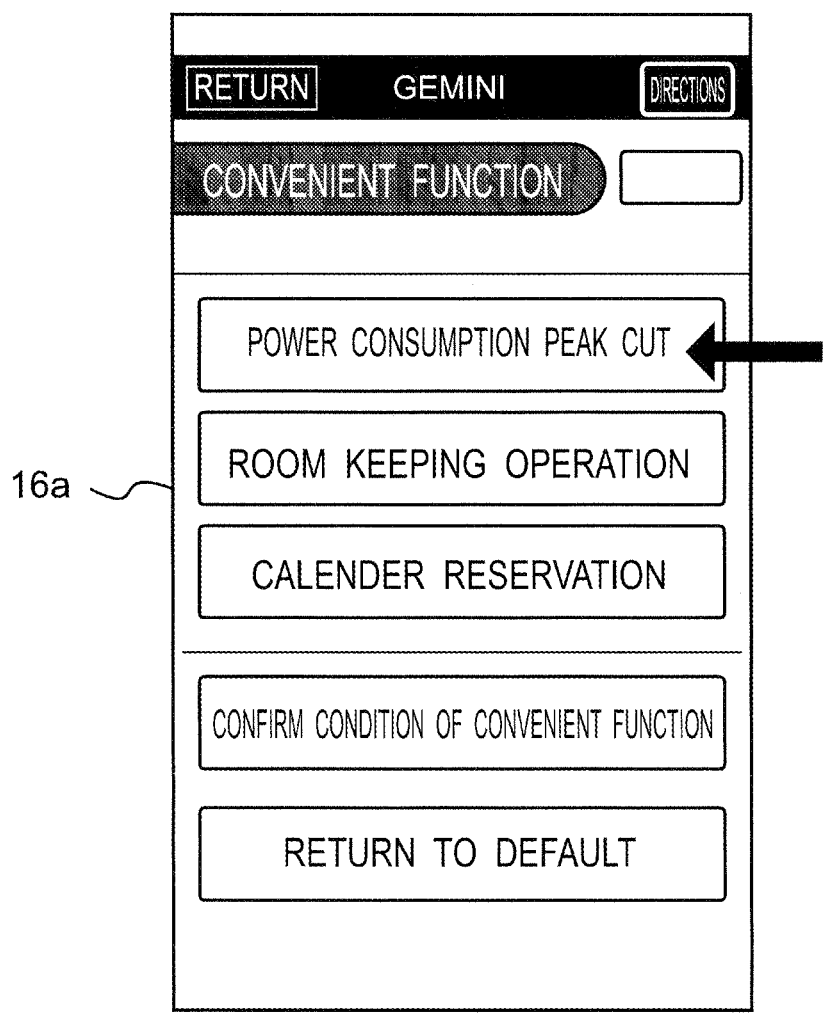
FIG. 4 is a diagram of a screen of the mobile terminal related to the setting of the power consumption of the air-conditioner according to the first embodiment.

When a "convenient function" is selected by the user, selection buttons belonging to the "convenient function" ("power consumption peak cut", "room keeping operation", "calendar reservation", etc.) are displayed on the display unit 16a, as shown in FIG. 4.

Figure 5:
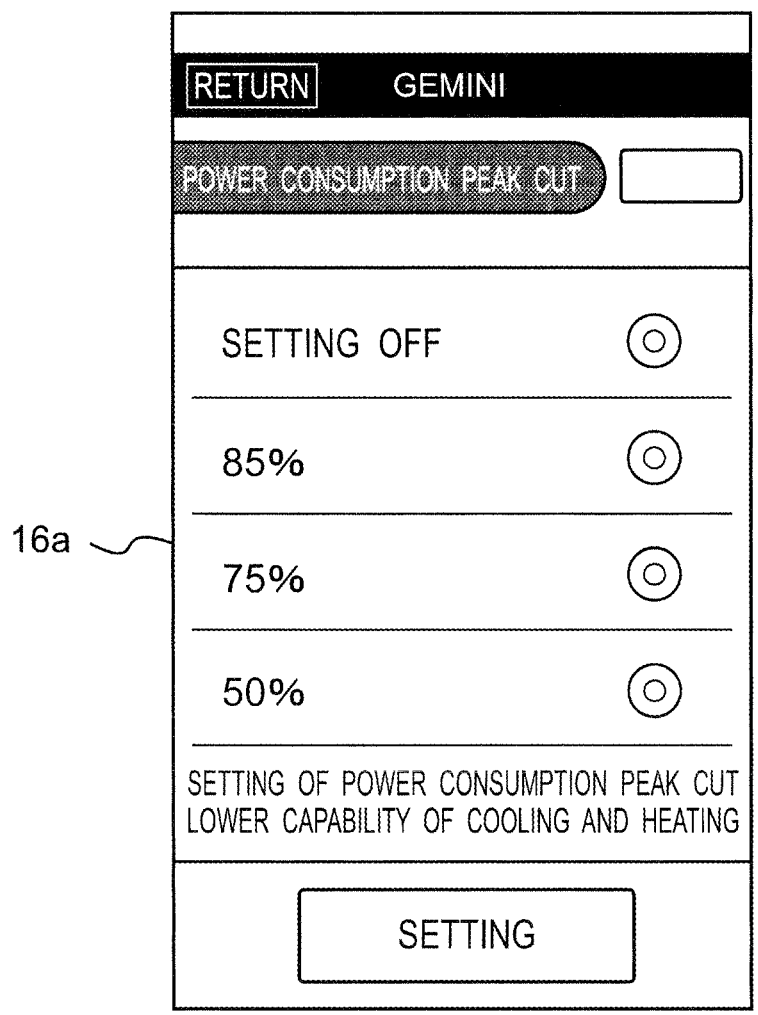
FIG. 5 is a diagram of a screen of the mobile terminal related to the setting of the power consumption of the air-conditioner according to the first embodiment.

When the "power consumption peak cut" is selected by the user, the display unit 16a displays items of "setting off", "85%", "75%", and "50%" as setting items related to the "power consumption peak cut", as shown in FIG. 5. When the "setting off" is selected, the setting of the power consumption peak cut in this first embodiment is turned off (released). When "85%", "75%", and "50" are selected, the operation of the air-conditioner 12-1 is set so that the peak of the power consumption of the air-conditioner 12-1 will be cut according to their respective rates, as described below.

Depending on the set rate of the power consumption peak cut ("85%", "75%", or "50%"), the setting value (current threshold) P1 for the current detecting unit 50 is set at the mobile terminal 16. The setting value P1 thus set is transmitted from the mobile terminal 16 to the air-conditioner 12-1 through the same communication path as described above. The transmitted setting value (current threshold) P1 is stored, for example, in a storage unit, not shown, of the air-conditioner 12-1.

1-2-2 Determination Flow of Power Consumption Peak Cut

Figures 6, 7:
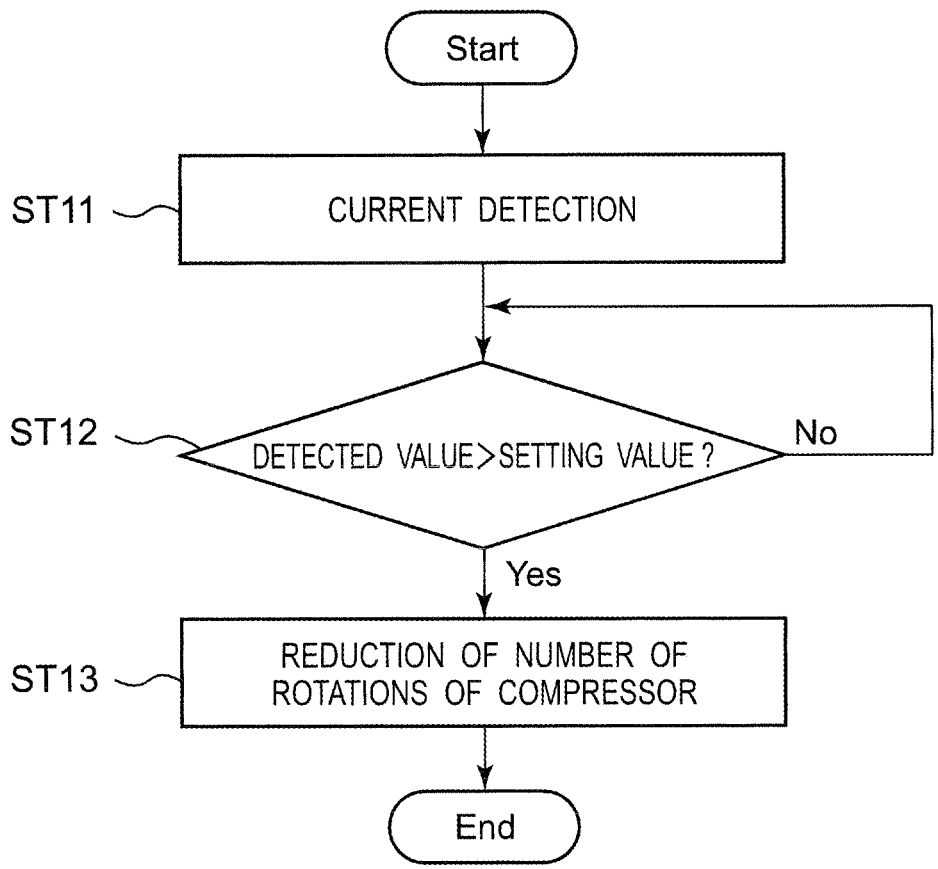
FIG. 6 is a diagram of a determination flow of a current peak cut of the air-conditioner according to the first embodiment.
FIG. 7 is a diagram of power consumption setting steps of a main body remote controller and the mobile terminal related to the setting of the air-conditioner according to the first embodiment.

A determination flow will then be described of the power consumption peak cut in the household electric appliance according to the first embodiment with reference to FIG. 6.

The current detecting unit 50 detects the current value of the power to be supplied from the indoor machine 30 to the outdoor machine 40 and transmits a detection signal to the controller 33b (step ST11). Specifically, the current detecting unit 50 compares the detected current value and the setting value P1 and transmits the detection signal D50 indicative of the results of the comparison to the controller 33b. The current value detected at the current detecting unit 50 and the setting value P1 may be compared at the controller 33b of the outdoor machine 40.

Then, the controller 33b, based on the detection signal D50 from the current detecting unit 50, determines if the detected current value is greater than the setting value P1 set (detected value>setting value P1?) (step ST12). If the detected current value is smaller than the setting value P1 set (step ST12:No), then the operation at step ST12 is repeated.

One case will be described in which the detected current value is greater than the setting value P1 set (step ST12:Yes). In this case, the controller 33b transmits the control signal (C41, C42) to control a drive circuit unit depending on the set peak cut rate to the drive circuit unit of the outdoor machine 40 (step ST13). For example, the case is cited of having the peak cut set at the rate of "85%". In this case, the controller 33b controls so that the maximum value of the power consumption (current) of the air-conditioner 12-1 will be 85% of the maximum value at the peak cut off time. Namely, the controller 33b transmits the control signal C42 to control the compressor drive circuit 42 to the compressor drive circuit 42 so that the number of rotations of the compressor (compressing machine) 44 will be reduced. The compressor drive circuit 42, upon reception of the control signal C42, reduces the number of rotations of the compressor 44 accordingly. Thus, it is made possible to cut the peak (maximum value) of the power consumption depending on the predetermined rate set.

The example was cited in which when the detected value exceeds the setting value P1 (step ST12:Yes), the controller 33b transmits the control signal C42 to the compressor drive circuit 42 so that the number of rotations of the compressor 44 will be reduced. For the reduction of the number of rotations of the compressor 44 is the most effective for the reduction of the power consumption. Same effect can be obtained, however, even if, when the detected value exceeds the setting value P1 (step ST12:Yes), the controller 33b transmits the control signal C41 to the fan drive circuit 41 so that the number of rotations of the fan 43 will be reduced. The controller 33b may control, by transmitting the control signals C41 and C42, so that the number of rotations of the fan 43 and the compressor 44 will be reduced according to the set rate of the power consumption cut.

1-2-3 About Setting of Power Consumption Cut

Setting will then be described of the power consumption cut in the main body remote controller and the mobile terminal with reference to FIG. 7. In the above description, the power consumption cut is set from the mobile terminal (smartphone, etc.). In the setting from the mobile terminal 16, four steps of "100% (setting off)", "85%", "75%", and "50%" can be selected for the power consumption peak cut, in "cooling" and "heating" of the air-conditioners 12-1 to 12-3.

Further, in this first embodiment, the remote controller attached to the main body (main body remote controller) can make the same setting as by the mobile terminal 16 described above (setting of "power saving mode"). In the case of the setting by the remote controller, two steps of "100% (setting off)" and "85%" can be selected for the power consumption peak cut in the "cooling" and the "heating" of the air-conditioners 12-1 to 12-3.

1-3 Effects

According to the household electric appliance and the household electric system of the first embodiment, the following effect (1) can be obtained.

(1) Capable of promptly responding to electric power demand in which power consumption peak cut is requested.

As described above, the air-conditioners (household electric appliances) 12-1 to 12-3 have the following elements:

(1-1) receiving units 32 and 34 that receive a request for the power consumption peak cut at a predetermined rate from the mobile terminal 16 and the remote controller;

(1-2) a drive unit 40 that drives power-consuming objects to be driven;

(1-3) the controllers (control units) 33a and 33b that control the operation of the drive unit; and (1-4) the detecting unit 50 that detects the current flowing through a predetermined current path within the appliance (air-conditioner) and transmits results of the detection to the controller.

In the case of reception of the peak cut request from the mobile terminal 16 and the remote controller, the controllers 33a and 33b control the operation of the drive unit so that the maximum value of the power consumption within the appliance will be cut based on the requested rate.

More specifically, the controller 33b, upon reception of the detection signal D50, transmits the control signal C42 to control the compressor drive circuit 42 so that the number of rotations of the compressor 44 of the outdoor machine 40 will be reduced according to the predetermined rate (steps ST11 to ST13). This is for the purpose of cutting the maximum electric power according to the predetermined rate.

Thus, the household electric appliance and the household electric system according to this first embodiment can directly detect the current and perform the power consumption peak cut, as compared with the conventional peak electric power cut system that performs the control to shift up a set temperature of the air-conditioner. Accordingly, the household electric appliance and the household electric system according to this first embodiment is advantageous in being capable of promptly responding to the electric power demand in which the peak cut of the power consumption is requested.

Figure 8:
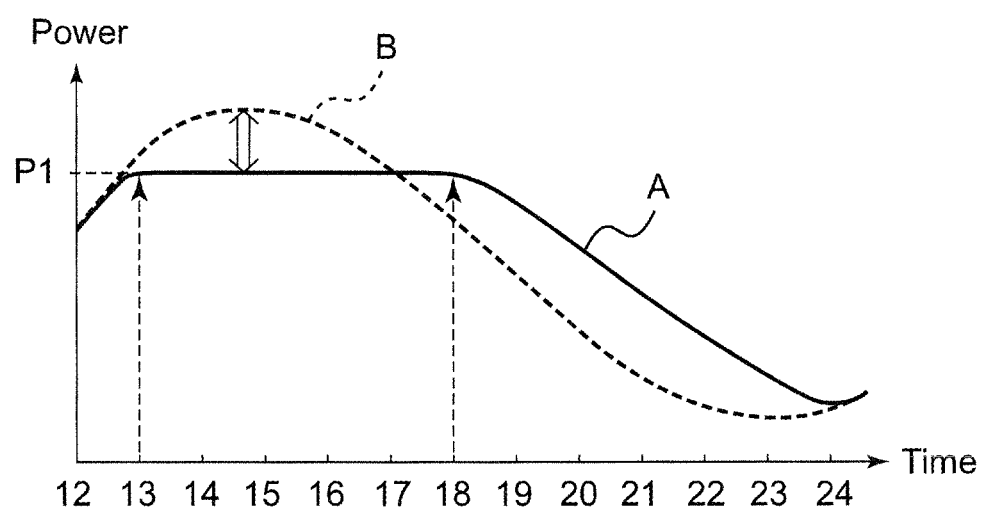
FIG. 8 is a diagram of a relationship of time and the power consumption of the air-conditioner according to the first embodiment.

For example, as described in the description related to the first embodiment, a relationship between the power consumption (Power) and the time (Time) in the case of the selection of the power consumption peak cut rate of "85%" can be indicated as shown by a solid line A of FIG. 8. As shown in FIG. 8, at time 13, when the peak cut rate "85%" is set by the mobile terminal 16, etc., the setting value (current threshold) "P1" of the current detection unit 50 is set depending on the setting.

Then, at time 13, since the detected current value is greater than the setting value P1, the current detecting unit 50 transmits the detection signal D50 notifying that the setting value P1 has been exceeded to the controller 33b. The controller 33b, upon reception of the detection signal D50, controls the compressor drive circuit 42 to reduce the number of rotations of the compressor 44 of the outdoor machine 40 so that the maximum electric power will be cut according to the set peak cut rate of "85%".

In response, after time 13, the peak of the power consumption in excess of the setting value P1 can be cut promptly. On the other hand, as shown by a dash line B in the drawing, in the case of not performing the power consumption peak cut control according to this first embodiment, the peak of the power consumption cannot be cut and the electric power demand cannot be met promptly in which the peak cut of the power consumption is requested.

Then, at time 18, when the detected current value becomes smaller than the setting value P1, the current detecting unit 50 does not transmit the detection signal D50 to the controller 33b. For this reason, the control signal C42 of the controller 33b is not transmitted to the compressor drive circuit 42 and the number of rotation of the compressor 44 returns to the normal number of rotations.

With respect to the control unit in the first embodiment described above, description was made citing the controllers 33a and 33b that are arranged as separate pieces of hardware in the indoor machine 30 and the outdoor machine 40. The configuration of the control unit, however, is not limited to this but the control unit may be a controller that is not separate pieces of hardware and, for example, is arranged in either the indoor machine 30 or the outdoor machine 40. The current to be detected by the current detecting unit 50 is not limited to the current flowing into the outdoor machine 40. The current detecting unit 50 is only required to be configured to be capable of detecting the current value/power value of a predetermined drive unit inside the air-conditioners 12-1 to 12-3. Further, the controller 33b may compare the detected value and the setting value (current threshold).

In this first embodiment, the air-conditioners 12-1 to 12-3 were cited as the household electric appliance but the household electric appliance is not limited to this. For example, the same control as described above can be performed to the drive unit of the compressor, etc., held by the refrigerator 13.

Second Embodiment

The conventional art document (e.g., Patent Document 2) discloses the air-conditioner that sets an upper-limit temperature and a lower-limit temperature of separate comfortable temperature ranges for summer and winter. The air-conditioner disclosed in Patent Document 2 compares an average room temperature measured based on the propagation speed of an ultrasonic wave and the upper-limit temperature and the lower-limit temperature of the comfortable temperature range. By controlling ON/OFF of the air-conditioner based on results of the comparison, the order of ON-OFF is inverted for summer and winter and a stop time is repeated by a timer intermittently in a given period of time. By this, the air-conditioner sets the upper-limit temperature and the lower-limit temperature of the comfortable temperature ranges separate for summer and winter.

According to the conventional art, however, when the room temperature is in the vicinity of the upper-limit temperature or the lower-limit temperature, there is a possibility of occurrence of an overshoot, etc. When the overshoot has occurred, it becomes necessary to bring the room temperature back to within a set temperature range. To bring the room temperature back to the set temperature, the power consumption increases.

In light of the above problem, a second embodiment according to the present invention provides a household electric appliance and a household electric system that reduce the power consumption while appropriately controlling an output temperature.

The household electric system according to the second embodiment will now be described with reference to FIGS. 9 to 20. In the following, description will be made citing the example of the household electric system having at least the air-conditioner as the household electric appliance. The household electric system according to the second embodiment is not limited to the one having the air-conditioner but may be the one having other household electric appliance of the refrigerator, the rice cooker, the washing machine, etc.

2-1 Configuration 2-1-1 Configuration of Household Electric System

The configuration of the household electric system according to the second embodiment is substantially the same as that of the household electric system according to the first embodiment shown in FIG. 1. Namely, as shown in FIG. 1, the household electric system 10 according to the second embodiment as well is a system that controls a plurality of household electric appliances by the mobile terminal 16, etc. With respect to the second embodiment as well, description will be made citing three air-conditioning devices 12-1 to 12-3 and the refrigerator 13 as examples of the plurality of household electric appliances.

The household electric system 10 according to the second embodiment has, in the same manner as in the first embodiment, the air-conditioners 12-1 to 12-3, the refrigerator 13, the radio adaptor (communication device) 14, the mobile terminal 16, the gateway device (relay device) 18, the router device 26, the Internet 20, and the server device 22.

2-1-2 Configuration of Air-Conditioner

Figure 9:
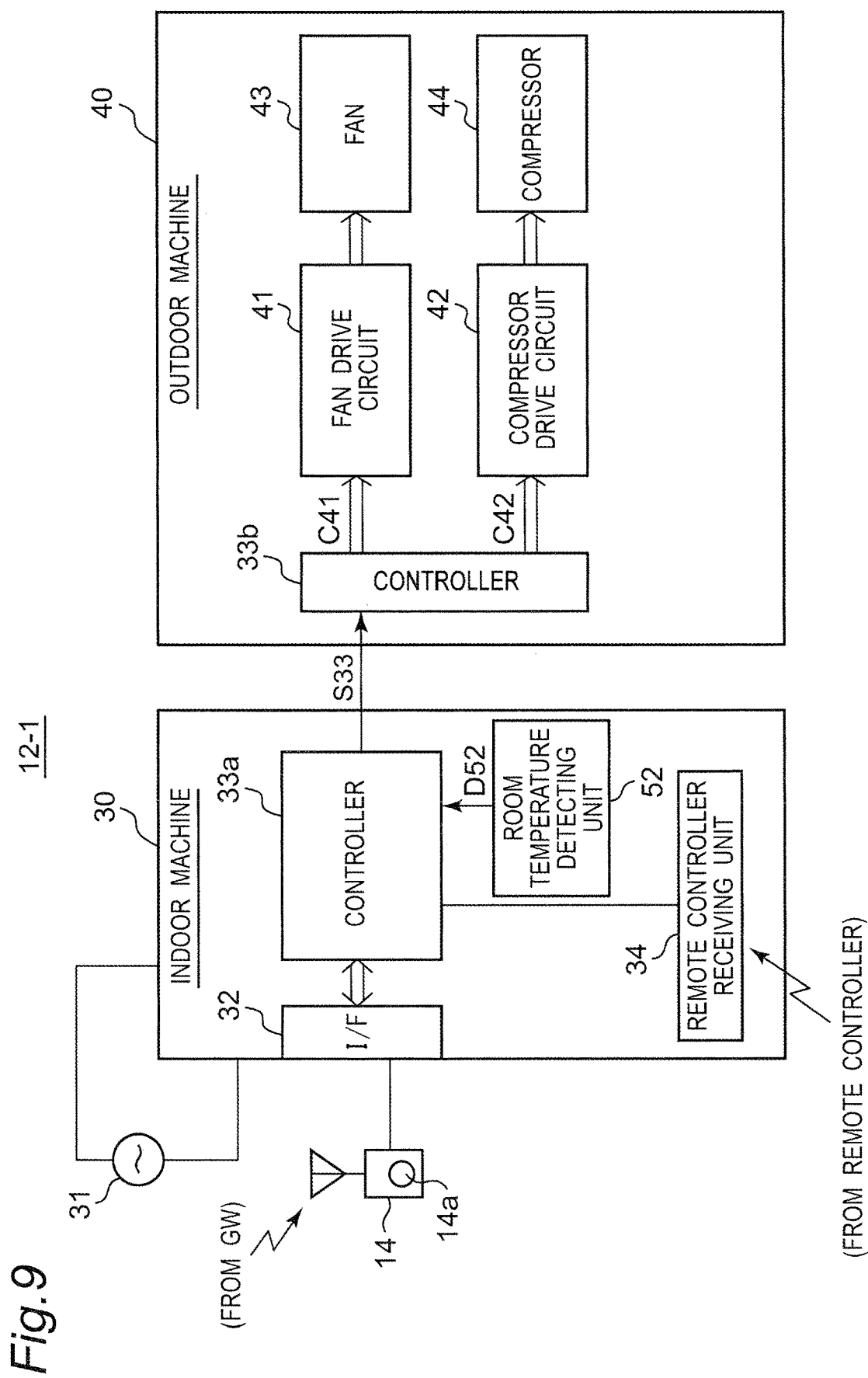
FIG. 9 is a diagram of a configuration of the air-conditioner according to a second embodiment.

A configuration example will then be described of the air-conditioner according to the second embodiment with reference to FIG. 9. Since the configuration of the air-conditioner according to the second embodiment is substantially the same as that of the air-conditioner according to the first embodiment shown in FIG. 2, description will now be made with a focus on a difference between the two configurations. The configuration related with the refrigerating cycle is omitted in FIG. 9.

As shown in FIG. 9, the air-conditioner 12-1 according to the second embodiment is composed of the indoor machine 30 and the outdoor machine 40. The indoor machine 30 has the interface 32, the controller 33a, the remote controller receiving unit 34, and a room temperature detecting unit 52. The indoor machine 30 is supplied with power from, for example, the commercial power source (AC source) 31 inside the house 24. The interface (I/F) 32 performs exchange of data, etc., between the radio adaptor 14 and the air-conditioner 12-1 (controller 33a).

The controller (control unit) 33a controls the operation of the indoor machine 30. Suppose that the controller 33a has received, for example, an instruction signal instructing an "eco-keeping operation", with the upper-limit temperature and the lower-limit temperature set, from the mobile terminal 16 by way of the gateway device 18 and the radio adaptor 14. Then, the controller 33a transmits the received instruction signal S33 to the controller 33b so that the air-conditioner will maintain the room temperature that is lower by a predetermined temperature width than the upper-limit temperature and that is higher by a predetermined temperature width than the lower-limit temperature. Details of the "eco-keeping operation" will be described later.

The remote controller receiving unit 34 receives the remote controller operation signal from the main body remote controller of this air-conditioner 12-1 and transmits the signal to the controller 33a. The controller 33a in reception of the remote controller operation signal from the main body remote controller controls, in the same manner as in the case of reception of the instruction signal from the mobile terminal 16, the operation of the air-conditioner 12-1, depending on the operation signal.

The room temperature detecting unit 52 detects the room temperature inside the room in which the air-conditioner 12-1 is arranged inside the house 24 and transmits the detected temperature as a detection signal D52 to the controller 33a.

The outdoor machine 40 has the controller 33b, the fan drive circuit 41, the compressor drive circuit 42, the fan 43, and the compressor 44. The outdoor machine 40 is supplied with power from the indoor machine 30.

The controller (control unit) 33b controls the operation of the outdoor machine 40, depending on the instruction signal transmitted from the controller 33a of the indoor machine 30.

For example, one case is assumed in which the eco-keeping operation action is set in the controller 33b, depending on the instruction signal S33 transmitted from the controller 33a. In this case, the controller 33b transmits to the compressor drive circuit 42 the control signal C42 to control the compressor drive circuit 42, for example, to reduce the number of rotation of the compressor 44. Details of the eco-keeping operation action will be described later.

The fan drive circuit 41 receives the control signal C41 from the controller 33b and controls the drive of the fan 43 in respect of the number of rotations, etc. The compressor (compressing machine) drive circuit 42 receives the control signal C42 from the controller 33b and controls the drive of the compressor (compressing machine) 44 in respect of the number of rotations, etc.

The fan 43 operates under control of the fan drive circuit 41 and generates the airflow to radiate or absorb heat of the refrigerant in the outdoor heat exchanger (not shown).

The compressor (compressing machine) 44, under control of the compressor drive circuit 42, compresses the refrigerant (not shown) circulating inside the air-conditioner 12-1.

2-2 Eco-Keeping Operation Action

The action will then be described of the eco-keeping operation in the air-conditioner according to the first embodiment. The "eco-keeping operation" is the operation by which the room temperature is regulated to a range of temperature that is lower by a predetermined temperature width than the upper-limit temperature set in the air-conditioner and that is higher by a predetermined temperature width than the lower-limit temperature set in the air-conditioner. In the following, while the action will be described of the eco-keeping operation in the air-conditioner 12-1, the case is the same with the eco-keeping operation action in the air-conditioners 12-2 and 12-3.

2-2-1 Setting of Eco-Keeping Operation Action

Figure 10:
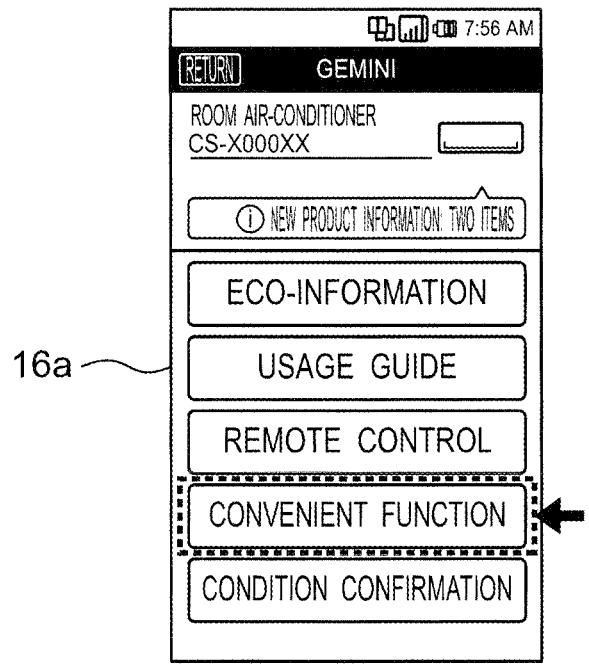
FIG. 10 is a diagram of a display unit of the mobile terminal for the setting of an eco-keeping operation action according to the second embodiment.

Setting will be described of the eco-keeping operation action in the air-conditioner according to the second embodiment with reference to FIGS. 10 to 12. In the following, the setting by way of the display unit (touch panel) 16a of the mobile terminal 16 is cited as an example. It is assumed that the mobile terminal 16 in this example is the smartphone, etc., having the display unit (touch panel) 16a and that the operation program for the air-conditioner 12-1 is already installed therein by way of the Internet 20.

When the operation program of the air-conditioner 12-1 (model number: CS-X00XX) is started in the mobile terminal 16, such a screen including various selection items as shown in FIG. 10 is displayed on the display unit 16a of the mobile terminal 16.

Figure 11:
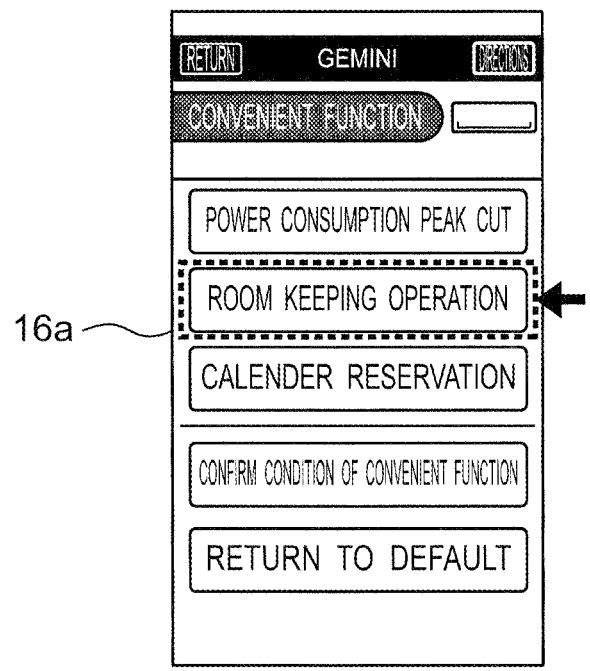
FIG. 11 is a diagram of the display unit of the mobile terminal for the setting of the eco-keeping operation action according to the second embodiment.

When the "convenient function" is selected by the user, the selection buttons belonging to the "convenient function" ("power consumption peak cut", "room keeping operation", "calendar reservation", etc.) are displayed on the display unit 16a, as shown in FIG. 11.

Figures 12, 13:
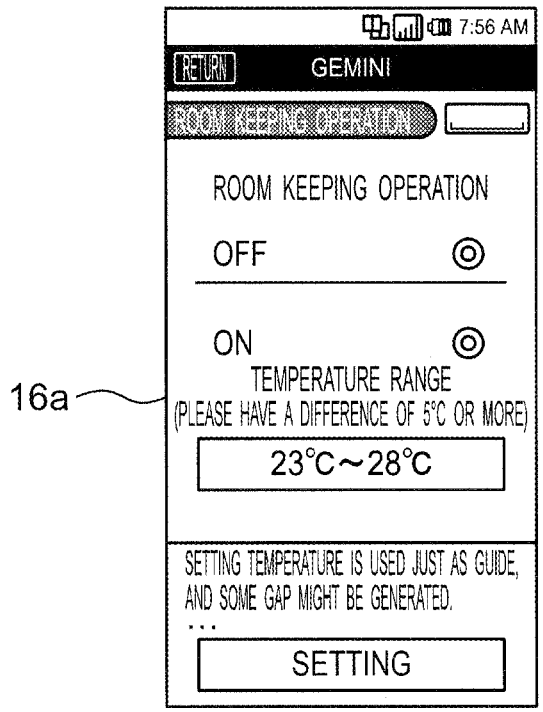
FIG. 12 is a diagram of the display unit of the mobile terminal for the setting of the eco-keeping operation action according to the second embodiment.
FIG. 13 is a diagram for description of a relationship between a room temperature setting temperature and an upper-limit temperature and a lower-limit temperature according to the second embodiment.

When the "room keeping operation" is selected by the user, the display unit 16a displays items of "off", "on, and "temperature range (Please have a difference of 5° C. or more)" as the setting items related to the "room keeping operation", as shown in FIG. 12. When "off" is selected, the setting of the eco-keeping operation action in the air-conditioner 12-1 is turned off (released). When "on" is selected, the setting of the eco-keeping operation action in the air-conditioner 12-1 is turned on. Further, with the user selecting, for example, "temperature range" related to the room temperature including a temperature difference of 5° C. or more and lastly depressing "setting", setting of the eco-keeping operation action is made based on the setting value set by the user.

Depending on the "temperature range" related to the room temperature selected by the user (in the example shown in FIG. 12, the room temperature setting temperature is within the range of "23° C. to 28° C."), the setting value of the room temperature detecting unit 52 is set. The setting value thus set is transmitted from the mobile terminal 16 to the air-conditioner 12-1 through the same communication path as described above. The transmitted setting value, together with an air volume and a wind direction, is stored, for example, in a storage unit, not shown, of the air-conditioner 12-1.

FIG. 13 denotes an example of the setting related to an operation mode, a main body setting temperature (setting value), the air volume, and the wind direction when the upper-limit and the lower-limit setting temperatures of the room temperature are set at 28° C. and 23° C., respectively (namely, when the set temperature range is 23° C. to 28° C.). As shown in FIG. 13, when the room temperature is higher than the set upper-limit temperature (28° C. in this example) (room temperature>set upper-limit temperature), the setting is made so that the operation mode of the air-conditioner 12-1 will be "cooling", the main body setting temperature "27° C.", and the air volume and the wind direction "automatic". In particular, in the example of FIG. 13, when the room temperature is higher than the set upper-limit temperature (room temperature>set upper-limit temperature), the main body setting temperature of the air-conditioner 12-1 is set at the temperature (27° C. in this example) that is lower by the predetermined temperature (1° C. in this example) than the upper-limit temperature set by the user. By the cooling operation mode with the air volume and the wind direction set at "automatic", the control is performed so that the room temperature will be kept at the temperature (27° C.) that is lower by the predetermined temperature than the set upper-limit temperature.

Likewise, when the room temperature is lower than the set lower-limit temperature (23° C. in this example) (room temperature<set lower-limit temperature), the setting is made so that the operation mode of the air-conditioner 12-1 will be "heating", the main body setting temperature "24° C.", and the air volume and the wind direction "automatic". In particular, in the example of FIG. 13, when the room temperature is lower than the set lower-limit temperature (room temperature<set lower-limit temperature), the main body setting temperature of the air-conditioner 12-1 is set at the temperature (24° C. in this example) that is higher by the predetermined temperature (1° C. in this example) than the lower-limit temperature set by the user. By the heating operation mode with the air volume and the wind direction set at "automatic", the control is performed so that the room temperature will be kept at the temperature (24° C.) that is higher by the predetermined temperature than the set lower-limit temperature.

2-2-2 Action Flow of Eco-Keeping Operation

Figure 14:
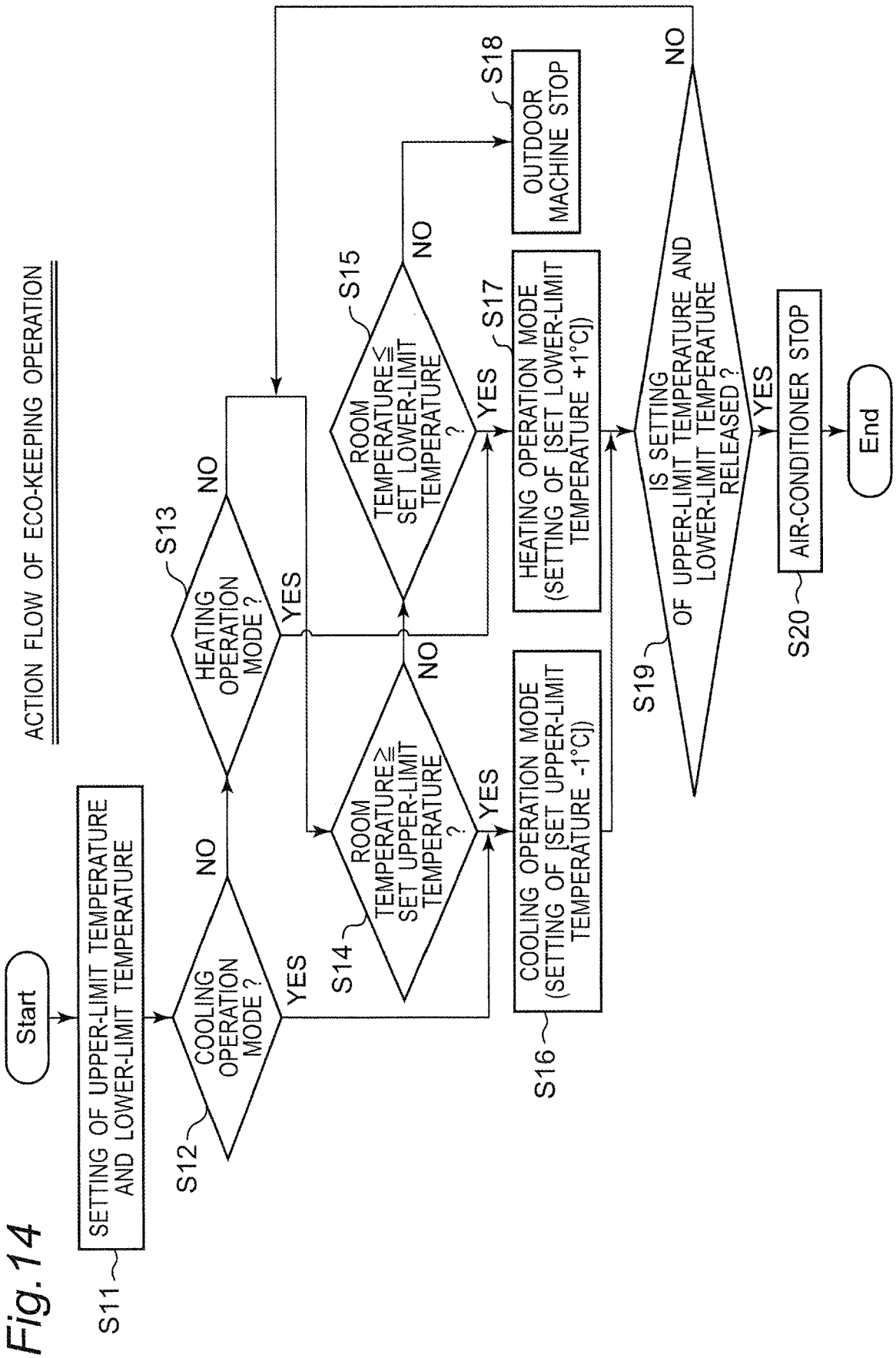
FIG. 14 is a flowchart of the eco-keeping operation action according to the second embodiment.

An action flow will then be described of the eco-keeping operation in the household electric appliance (air-conditioner) according to the second embodiment with reference to FIG. 14.

The upper-limit temperature and the lower-limit temperature are set by the user on the mobile terminal 16 (step S11). By way of example, it is assumed that the upper-limit temperature is 28° C. and that the lower-limit temperature is 23° C. It is desirable that a temperature difference between the upper-limit temperature and the lower-limit temperature is 5° C. or more. The temperature difference, however, is not limited to this temperature difference but may be set at 3° C. or more.

Then, the controllers 33a and 33b determine if the operation mode of the air-conditioner 12-1 is the cooling operation mode (step S12).

If it is determined that the operation mode is not the cooling operation mode (step S12:No), then the controllers 33a and 33b determine if the operation mode of the air-conditioner 12-1 is the heating operation mode (step S13).

If it is determined that the operation mode is not the heating operation mode (step S13:No), then the controllers 33a, based on the detection signal D52 received from the room temperature detecting unit 52, determines if the room temperature is equal to or higher than the set upper-limit temperature (28° C. in this example) (step S14).

On the other hand, at step S14, if it is determined that the room temperature is not equal to or higher than the set upper-limit temperature, then the controller 33a, based on the detection signal D52, determines if the room temperature is equal to or lower than the set lower-limit temperature (23° C. in this example) (step S15).

The case will be described in which it is determined at step S12 that the operation mode is the cooling operation mode (step S12:Yes) or in which it is determined at step S14 that the room temperature is equal to or higher than the set upper-limit temperature (step S14:Yes). In this case, the controllers 33a and 33b control so that the room temperature will be kept at the temperature (27° C.) that is lower by the predetermined temperature than the set upper-limit temperature (step S16). Specifically, at this step S16, the controller 33a transmits the instruction signal S33 so that the room temperature will become the temperature (27° C.) that is lower by the predetermined temperature than the set upper-limit temperature. The controller 33b in reception of the instruction signal S33 transmits the control signal C42 so that the number of rotations of the compressor 44 will be increased (or decreased) to lower (raise) the room temperature. Thereafter, when the room temperature reaches the temperature (27° C.) that is lower by the predetermined temperature than the set upper-limit temperature, the controller 33a transmits the instruction signal S33 so that the number of rotations of the compressor 44 will be maintained to keep the room temperature. The controller 33b in reception of the instruction signal S33 transmits the control signal C42 so that the number of rotations of the compressor 44 will be maintained.

The case will be described in which it is determined at step S13 that the operation mode is the heating operation mode (step S13:Yes) or in which it is determined at step S15 that the room temperature is equal to or lower than the set lower-limit temperature (step S15:Yes). In this case, the controllers 33a and 33b control so that the room temperature will become the temperature (24° C.) that is higher by the predetermined temperature than the set lower-limit temperature (step S17). Specifically, at step S17, the controller 33a transmits the instruction signal S33 so that the room temperature will become the temperature (24° C.) that is higher by the predetermined temperature than the set lower-limit temperature. The controller 33b in reception of the instruction signal S33 transmits the control signal C42 so that the number of rotations of the compressor 44 will be increased (or decreased) to raise (lower) the room temperature. Thereafter, when the room temperature reaches the temperature (24° C.) that is higher by the predetermined temperature than the set lower-limit temperature, the controller 33a transmits the instruction signal S33 so that the number of rotations of the compressor 44 will be maintained to keep the room temperature. The controller 33b in reception of the instruction signal S33 transmits the control signal C42 so that the number of rotations of the compressor 44 will be maintained.

At step S15, if it is determined that the room temperature is not equal to or lower than the set lower-limit temperature (step S15:No), the controllers 33a and 33b stop the outdoor machine of the air-conditioner 12-1 (step S18).

Further, during the cooling operation at step S16 or during the heating operation at step S17, the controller 33a determines if the setting of the upper-limit temperature and the lower-limit temperature is released by the user's mobile terminal (step S19). If the setting of the upper-limit temperature and the lower-limit temperature is not released (step S19:No), then the controller 33a returns to step S14 and performs the same operation as described above.

If the setting of the upper-limit temperature and the lower-limit temperature is released (step S19:Yes), then the controllers 33a and 33b stop the air-conditioner 12-1, completing the eco-keeping operation action (step S20).

In the above description, at steps S16 and S17, the example was cited of the controller 33b transmitting the control signal C42 so that the number of rotations of the compressor 44 will be increased (or decreased) and thereafter the number of rotations will be maintained. However, the control by the controller 33b is not limited to this kind of control. Namely, at steps S16 and S17, same effect can be obtained by the controller 33b transmitting the control signal C41 to the fan drive circuit 41 so that the number of rotations of the fan 43 will likewise be increased (or decreased) and thereafter the number of rotations will be maintained. The controller 33b may control by transmitting the control signals C41 and C42 combined.

2-2-3 Temperature Control of Eco-Keeping Operation

A temperature control will be described of the eco-keeping operation in various seasons and time zones with reference to FIGS. 15 to 19. In the following, it is assumed that the upper-limit temperature and the lower-limit temperature have been set at 28° C. and 23° C., respectively, by the user using the mobile terminal 16.

(1) Temperature Control 1-1 (During Cooling Stop in Summer)

Figure 15:
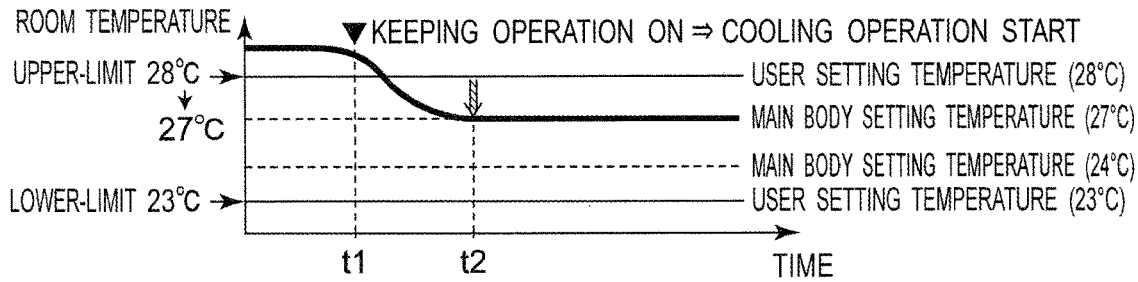
FIG. 15 is a diagram of a temperature control according to the second embodiment.

One case will be described in which the eco-keeping operation is set while the cooling operation of the air-conditioner 12-1 is stopped, for example, in summer, with reference to FIG. 15. As shown in FIG. 15, in a state where the room temperature is higher than the upper-limit temperature (28° C.), if the eco-keeping operation is set by the user at time t1, the controllers 33a and 33b cause the cooling operation to be started. The controllers 33a and 33b cause the cooling operation to be performed until the room temperature becomes the temperature (27° C.) that is lower by the predetermined temperature than the upper-limit temperature (28° C.). Specifically, the controllers 33a and 33b control the air-conditioner 12-1 so that the number of rotations of the compressor 44 will be increased to lower the room temperature until the room temperature reaches the temperature (main body setting temperature: 27° C.) that is lower by the predetermined temperature than the upper-limit temperature.

Then, at time t2, when the room temperature reaches the temperature (main body setting temperature: 27° C.) that is lower by the predetermined temperature than the upper-limit temperature, the controllers 33a and 33b cause the cooling operation to be continued so that the room temperature will be kept at the main body setting temperature (27° C.) Specifically, the controllers 33a and 33b control the air-conditioner 12-1 to maintain the number of rotations of the compressor 44 so that the room temperature will be kept at the main body setting temperature (27° C.)

In time thereafter, the controllers 33a and 33b perform the same control so that the room temperature will be kept at the main body setting temperature (27° C.)

(2) Temperature Control 1-2 (During Cooling Operation in Summer)

Figure 16:
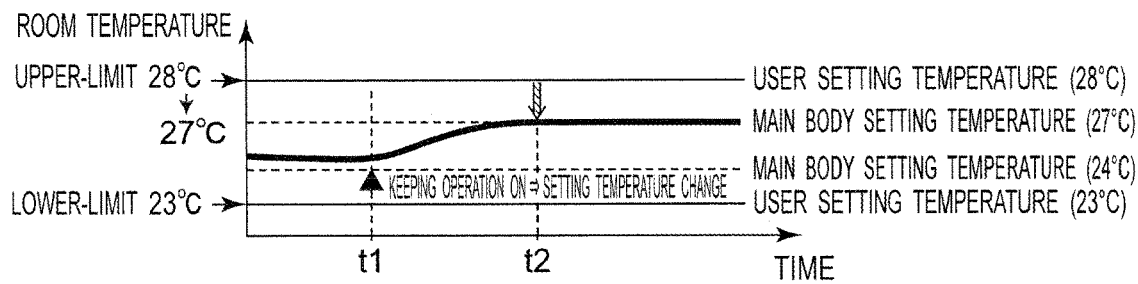
FIG. 16 is a diagram of the temperature control according to the second embodiment.

One case will be described in which the eco-keeping operation is set while the cooling operation of the air-conditioner is in operation, for example, in summer, with reference to FIG. 16. As shown in FIG. 16, in a state where the room temperature is lower than the upper-limit temperature (28° C.), if the eco-keeping operation is set by the user at time t1, the controllers 33a and 33b cause the setting temperature to be changed as described above. The controllers 33a and 33b then cause the cooling operation to be performed until the room temperature becomes the temperature (27° C.) that is lower by the predetermined temperature than the upper-limit temperature (28° C.). Specifically, the controllers 33a and 33b control the air-conditioner 12-1 so that the number of rotations of the compressor 44 will be decreased to raise the room temperature until the room temperature reaches the temperature (main body setting temperature: 27° C.) that is lower by the predetermined temperature than the upper-limit temperature.

Then, at time t2, when the room temperature reaches the temperature (main body setting temperature: 27° C.) that is lower by the predetermined temperature than the upper-limit temperature, the controllers 33a and 33b cause the cooling operation to be continued so that the room temperature will be kept at the main body setting temperature (27° C.) Specifically, the controllers 33a and 33b control the air-conditioner 12-1 to maintain the number of rotations of the compressor 44 so that the room temperature will be kept at the main body setting temperature (27° C.)

In time thereafter, the controllers 33a and 33b perform the same control so that the room temperature will be kept at the main body setting temperature (27° C.)

(3) Temperature Control 2-1 (During Heating Stop in Winter)

Figure 17:
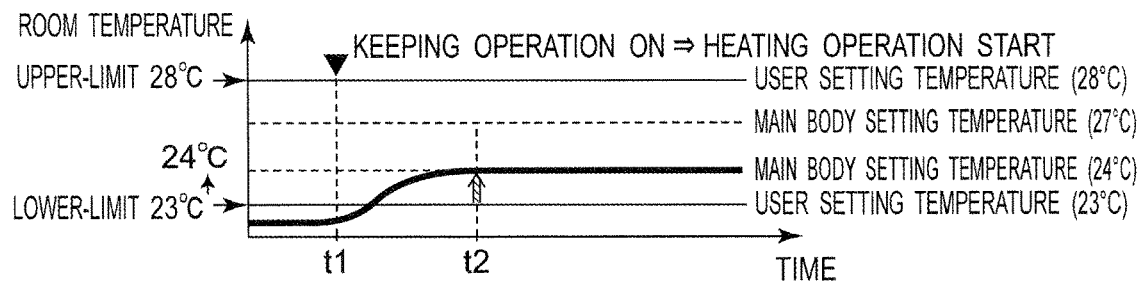
FIG. 17 is a diagram of the temperature control according to the second embodiment.

One case will be described in which the eco-keeping operation is set while the heating operation of the air-conditioner 12-1 is stopped, for example, in winter, with reference to FIG. 17. As shown in FIG. 17, in a state where the room temperature is lower than the lower-limit temperature (23° C.), if the eco-keeping operation is set by the user at time t1, the controllers 33a and 33b cause the heating operation to be started. The controllers 33a and 33b cause the heating operation to be performed until the room temperature becomes the temperature (24° C.) that is higher by the predetermined temperature than the lower-limit temperature (23° C.). Specifically, the controllers 33a and 33b control the air-conditioner 12-1 so that the number of rotations of the compressor 44 will be increased to raise the room temperature until the room temperature reaches the temperature (main body setting temperature: 24° C.) that is higher by the predetermined temperature than the lower-limit temperature.

Then, at time t2, when the room temperature reaches the temperature (main body setting temperature: 24° C.) that is higher by the predetermined temperature than the lower-limit temperature, the controllers 33a and 33b cause the heating operation to be continued so that the room temperature will be kept at the main body setting temperature (24° C.) Specifically, the controllers 33a and 33b control the air-conditioner 12-1 to maintain the number of rotations of the compressor 44 so that the room temperature will be kept at the main body setting temperature (24° C.)

In time thereafter, the controllers 33a and 33b perform the same control so that the room temperature will be kept at the main body setting temperature (24° C.)

(4) Temperature Control 2-2 (During Heating Operation in Winter)

Figure 18:
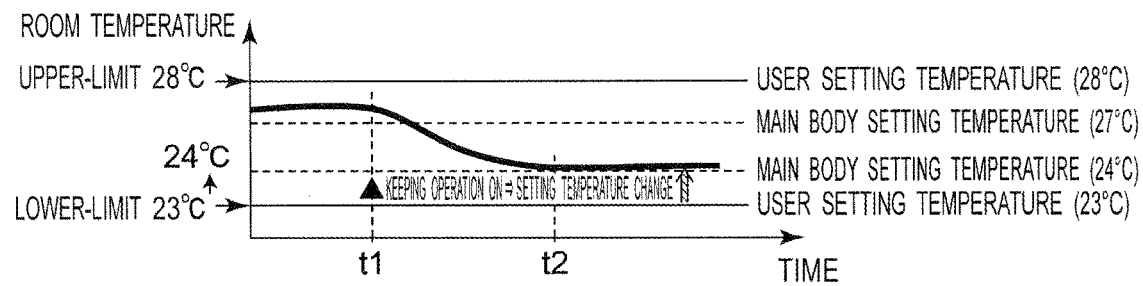
FIG. 18 is a diagram of the temperature control according to the second embodiment.

One case will be described in which the eco-keeping operation is started while the heating operation of the air-conditioner is in operation, for example, in winter, with reference to FIG. 18. As shown in FIG. 18, in a state where the room temperature is higher than the lower-limit temperature (23° C.), if the eco-keeping operation is set by the user at time t1, the controllers 33a and 33b cause the setting temperature to be changed as described above. The controllers 33a and 33b then cause the heating operation to be performed until the room temperature becomes the temperature (24° C.) that is higher by the predetermined temperature than the lower-limit temperature (23° C.). Specifically, the controllers 33a and 33b control the air-conditioner 12-1 so that the number of rotations of the compressor 44 will be decreased to lower the room temperature until the room temperature reaches the temperature (main body setting temperature: 24° C.) that is higher by the predetermined temperature than the lower-limit temperature.

Then, at time t2, when the room temperature reaches the temperature (main body setting temperature: 24° C.) that is higher by the predetermined temperature than the lower-limit temperature, the controllers 33a and 33b cause the heating operation to be continued so that the room temperature will be kept at the main body setting temperature (24° C.) Specifically, the controllers 33a and 33b control the air-conditioner 12-1 to maintain the number of rotations of the compressor 44 so that the room temperature will be kept at the main body setting temperature (24° C.)

In time thereafter, the controllers 33a and 33b perform the same control so that the room temperature will be kept at the main body setting temperature (24° C.)

(5) Temperature Control 3 (Case of all-Day Operation in Spring and Fall)

Figure 19:
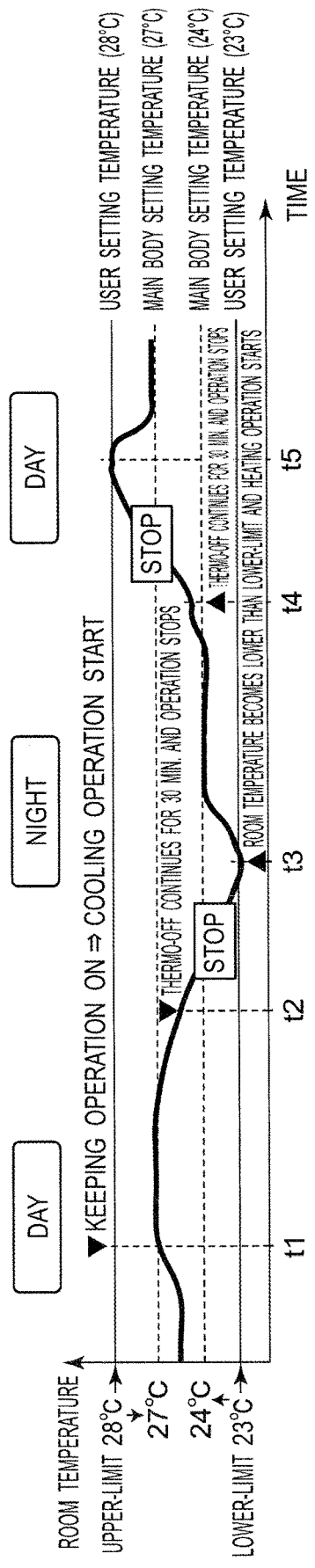
FIG. 19 is a diagram of the temperature control according to the second embodiment.

One case will be described of causing the air-conditioner 12-1 to perform the eco-keeping operation all day long, for example, in spring and fall, with reference to FIG. 19. As shown in FIG. 19, in the daytime of spring and fall, in a state in which the room temperature is between the lower-limit temperature (23° C.) and the upper-limit temperature (28° C.), if the eco-keeping operation is set by the user at time t1, the controllers 33a and 33b cause the cooling operation to be started. The controllers 33a and 33b likewise cause the cooling operation to be continued so that the room temperature will be kept at the temperature (main body setting temperature: about 27° C.) that is lower by the predetermined temperature than the upper-limit temperature (28° C.)

Then, at time t2, if the main body setting temperature (27° C.) has been continued for 30 minutes or more, the controllers 33a and 33b cause "thermo-off state" to be continued for 30 minutes or more and cause the cooling operation to be stopped. The "thermo-off state" is the state of operating an indoor fan (not shown) while stopping the operation of the compressor 44.

Then, at time t3, when the room temperature becomes lower than the lower-limit temperature (23° C.) in the evening and at night, the controllers 33a and 33b cause the heating operation to be started. The controllers 33a and 33b likewise cause the heating operation to be continued so that the room temperature will be kept at the temperature (main body setting temperature: about 24° C.) that is higher by the predetermined temperature than the lower-limit temperature (23° C.)

Then, at time t4, if the main body setting temperature (about 24° C.) has been continued for 30 minutes or more, the controllers 33a and 33b cause the heating operation to be stopped by causing the thermo-off state to be continued for 30 minutes or more.

Then, at time t5, when the room temperature becomes higher than the upper-limit temperature (28° C.) in the morning and at noon, the controllers 33a and 33b likewise cause the cooling operation to be started. The controllers 33a and 33b likewise cause the cooling operation to be continued so that the room temperature will be kept at the temperature (main body setting temperature: 27° C.) that is lower by the predetermined temperature than the upper-limit temperature (28° C.)

In time thereafter, the controllers 33a and 33b perform the same control so that the room temperature will be between the main body setting temperatures (about 24° C. to about 27° C.) until the eco-keeping operation is released.

As described above, in the example shown in FIG. 19, such a control is performed by which, if the room temperature becomes the main body setting temperature and further, the thermo-off state continues for more than the predetermined time, the operation is stopped. Such a control may be performed by which, if a temperature difference between the main body setting temperature and the room temperature is, for example, about 1.5 K (absolute value) or less at the time of cooling and about 2 K (absolute value) or less at the time of heating, the operation is not stopped, with the thermo-off operation continued.

This is due to the following reason. In the environment of a large load of an outside temperature, etc., if the operation is stopped completely, the room temperature can immediately begin to rise. Therefore, by controlling so that the operation is not stopped, with the thermo-off operation continued, an advantage can be obtained that the room temperature control is easy to perform.

2-3 Effects

According to the household electric appliance and the household electric system of the second embodiment, the effects of the following (1) and (2) can be obtained.

(1) The room temperature can be controlled to be at a set optimum temperature that is comfortable.

As described above, the controllers 33a and 33b of the air-conditioner 12-1 control the indoor machine 30 and the outdoor machine 40 to perform the eco-keeping operation. The eco-keeping operation makes the room temperature lower by the predetermined temperature width than the set upper-limit temperature and higher by the predetermined temperature width than the set lower-limit temperature.

Figure 20:
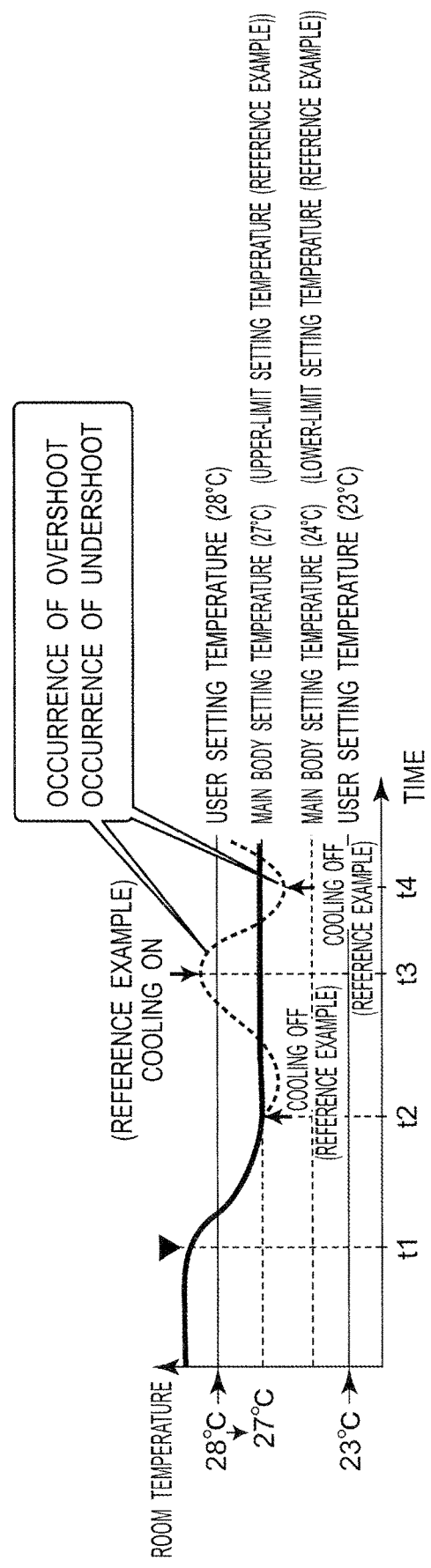
FIG. 20 is a diagram of the temperature control in the second embodiment and a reference example.

As indicated by a solid line of FIG. 20, in the air-conditioner according to the second embodiment, the controllers 33a and 33b performs the control so as to keep the temperature (main body first setting temperature: 27° C.) that is lower by the predetermined temperature than the upper-limit temperature set by the user (28° C.). For this reason, at time t2, when the room temperature reaches the temperature (first setting temperature: 27° C.) that is lower by the predetermined temperature than the upper-limit temperature, the controllers 33a and 33b cause the cooling operation, etc., to be continued so that the room temperature will be kept at the main body first setting temperature (27° C.)

By contrast, as in a reference example indicated by a dash line in FIG. 20, in the case of performing the control simply by the setting temperatures between the upper-limit temperature (27° C.) and the lower-limit temperature (24° C.), the overshoot and the undershoot tend to occur in the vicinity of the upper-limit temperature (27° C.). For this reason, the room temperature cannot constantly be within the comfortable setting temperature range. For example, in the case of the reference example, at time t2, when the room temperature reaches the upper-limit temperature (27° C.), the cooling operation is simply turned off (OFF). However, since the lowering of the room temperature cannot be controlled immediately, in practice, there occurs the undershoot in which the room temperature is lowered below the upper-limit temperature (27° C.). At time t3, in the state where the room temperature is in excess of the upper-limit temperature (27° C.), the cooling operation is again simply turned on (ON). However, since it is impossible to control so that the room temperature returns to the upper-limit temperature (27° C.) immediately after the turning-on, the overshoot occurs in which the room temperature exceeds the upper-limit temperature (27° C.)

Thus, the second embodiment can maintain the room temperature within the setting temperature range of the upper-limit temperature (28° C.) and the lower-limit temperature (23° C.) set by the user, without the occurrence of the overshoot and the undershoot as in the reference example. Therefore, the air-conditioner according to the second embodiment can control the room temperature to be at the comfortable setting temperature.

(2) There is a power consumption reduction effect.

As shown in the reference example, when the overshoot occurs by which the room temperature gets out of the setting temperature range, the room temperature need to be pulled back to the setting temperature (27° C.) as indicated by the dash line of FIG. 20. A fluctuation load is caused by such a pullback and therefore, the power consumption is increased. For example, at time t3, to pull the room temperature that has risen above the setting temperature (27° C.) back to the setting temperature (27° C.), the cooling operation is turned on (ON). To turn on (ON) the cooling operation, the indoor machine and the outdoor machine need to be started and this causes the fluctuation load, resulting in the increased power consumption.

By contrast, in the air-conditioner according to the second embodiment, since there is no occurrence of the overshoot as in the reference example, there is no occurrence of the fluctuation load associated with the occurrence of the overshoot. Therefore, the power consumption can be reduced. Since, for example, to the air-conditioner according to the second embodiment, it is only necessary to set one eco-keeping operation irrespective of the season as shown in FIGS. 15 to 19, the user is not required to be conscious about switching of the cooling operation and the heating operation throughout the year. For this reason, there is an advantage that the air-conditioners 12-1 to 12-3 can autonomously reduce the power consumption.

For example, if the air-conditioners 12-1 to 12-3 are arranged in a vacation house in which the user is absent for a long period of time, the temperature control in the air-conditioner according to the second embodiment is effective for plants, etc., requiring an appropriate temperature control inside the vacation house. In this case, the user can easily maintain the appropriate temperature control, in particular, an environment-conscious temperature control from outside the vacation house by the mobile terminal 16.

The effects (1) and (2) described above can likewise be obtained in the case of controlling so as to keep the temperature (main body second setting temperature: 24° C.) that is higher by the predetermined temperature than the lower-limit temperature (23° C.) (see FIGS. 17 to 19).

Third Embodiment (Case of Receiving Other Operation Changing Signals During Eco-Keeping Operation)

The household electric appliance (air-conditioner) according to a third embodiment will then be described with reference to FIG. 21. The third embodiment is related to the case of reception of other operation changing signals during the eco-keeping operation. In the following, such part of the description is omitted that overlaps the description of the household electric appliance according to the second embodiment.

It is assumed that, during the eco-keeping operation, the receiving units 32 and 34 receive operation change signals (various change signals such as mode, temperature, air volume, and stop signals) from the remote controller attached to the main body or the mobile terminal 16. Then, as shown in FIG. 21, the controllers 33a and 33b control so as to change the operation of the air-conditioners 12-1 to 12-3, based on the change signal transmitted later. Thus, the household electric appliance according to the third embodiment gives priority to the change signal transmitted later by the user by way of the mobile terminal 16, etc. (technological thought of later depressing priority).

For example, as shown in FIG. 21(A), it is assumed that, during the eco-keeping operation, the receiving unit 32 or 34 receives an eco-keeping operation release signal as a received signal at time t1. Then, the controllers 33a and 33b, giving priority to the release signal received later, cause the eco-keeping operation to be released based on the change signal, at time t1 and thereafter.

Likewise, as shown in FIG. 21(B), it is assumed that, during the eco-keeping operation, the receiving unit 32 or 34 receives a change signal to change the wind direction and air volume as a received signal from the main body remote controller or the mobile terminal 16 at time t1. Then, the controllers 33a and 33b, giving priority to the change signal received later, cause the wind direction and the air volume of the eco-keeping operation to be changed based on the change signal, at time t1 and thereafter.

Likewise, as shown in FIG. 21(C), it is assumed that, during the eco-keeping operation, the receiving unit 32 or 34 receives a stop signal as a received signal from the main body remote controller or the mobile terminal 16 at time t1. Then, the controllers 33a and 33b, giving priority to the stop signal received later, cause the eco-keeping operation to be released based on the stop signal, at time t1 and thereafter.

Likewise, as shown in FIG. 21(D), it is assumed that, during the eco-keeping operation, the receiving unit 32 or 34 receives a turning-on timer signal as a received signal at time t1. Then, the controllers 33a and 33b, giving priority to the turning-on timer signal received later, control based on the turning-on timer signal, at time t1 and thereafter.

Likewise, as shown in FIG. 21(E), it is assumed that, during the eco-keeping operation, the receiving unit 32 or 34 receives a turning-off timer signal as a received signal at time t1. Then, the controllers 33a and 33b, giving priority to the turning-off timer signal received later, control based on the turning-off timer signal, at time t1 and thereafter.

Likewise, as shown in FIG. 21(F), it is assumed that, while the air-conditioner is in the eco-keeping operation but the cooling and the heating are stopped, the receiving unit 32 or 34 receives an emergency operation switch signal as a received signal at time t1. Then, the controllers 33a and 33b, giving priority to the emergency operation switch signal received later, control based on the emergency operation switch, at time t1 and thereafter. Namely, the controllers 33a and 33b, based on the emergency operation switch, control the air-conditioners 12-1 to 12-3 being stopped to operate temporarily.

Likewise, as shown in FIG. 21(G), it is assumed that, during the eco-keeping operation, the receiving unit 32 or 34 receives the emergency operation switch signal as a received signal at time t1. Then, the controllers 33a and 33b, giving priority to the emergency operation switch signal received later, control based on the emergency operation switch, at time t1 and thereafter. Namely, the controllers 33a and 33b, based on the emergency operation switch, control the air-conditioners 12-1 to 12-3 in the eco-keeping operation to operate temporarily. In the case of FIG. 21(F) and FIG. 21(G), the controllers 33a and 33b determine whether to perform operation or stop operation, depending on the action mode (cooling, heating, etc.) of the eco-keeping operation.

Effects

According to the air-conditioner of the third embodiment, same effects can be obtained as the effects (1) and (2) in the air-conditioner according to the second embodiment. Further, in the air-conditioner according to the third embodiment, it is assumed that, during the eco-keeping operation, the receiving unit 32 or 34 receives the operation change signal from the remote controller attached to the main body or the mobile terminal 16. Then, the controllers 33a and 33b, based on the change signal received later, control so as to change the operation of the air-conditioners 12-1 to 12-3. Thus, the change signal transmitted later by the user is given priority and therefore, the user's convenience is enhanced.

Suppose that, during the cooling, etc., operation of the air-conditioners 12-1 to 12-3, the eco-keeping operation is set. In this case, the controllers 33a and 33b control so that the cooling operation mode in which the air-conditioner is operating will be continued and, with respect to the setting temperatures, the air-conditioner will operate according to the set upper-limit and lower-limit temperatures.

In the household electric system according to the second and the third embodiments, the air-conditioners 12-1 to 12-3 were cited as an example of the household electric appliance but the household electric appliance is not limited to this. For example, the same control as described above can also be performed, for example, to the drive unit of the compressor, etc., held by the refrigerator 13.

Further, the eco-keeping operation in the household electric system according to the second and the third embodiments may be settable only by the mobile terminal 16 such as the smartphone. The control unit in the household electric appliance (air-conditioner) according to the second and the third embodiments was described citing the controllers 33a and 33b arranged as separate pieces of hardware in the indoor machine 30 and the outdoor machine 40. However, the configuration of the control unit is not limited to this but the control unit may be a controller that is not separate pieces of hardware and that is arranged, for example, in either the indoor machine 30 or the outdoor machine 40.

INDUSTRIAL APPLICABILITY

The present disclosure is applicable to the household electric appliance such as the air-conditioner and the household electric system controlling the household electric appliance.

EXPLANATION OF LETTERS OR NUMERALS

10 . . . household electric system,
12-1 to 12-3 . . . air-conditioner (household electric appliance),
13 . . . refrigerator (household electric appliance),
14 . . . radio adaptor (communication device),
16 . . . mobile terminal,
18 . . . gateway device (relay device),
20 . . . Internet,
22 . . . server device,
26 . . . router device,
30 . . . indoor machine,
33a, 33b . . . controller (control unit),
32, 34 . . . receiving unit,
40 . . . outdoor machine,
50 . . . current detecting unit,
52 . . . room temperature detecting unit

The invention claimed is:

1. A household electric appliance comprising:
a receiving unit that receives a setting signal to set a predetermined air-conditioning operation with an upper-limit temperature and a lower-limit temperature of a room temperature set;
a drive unit that drives an object to be driven to regulate the room temperature; and
a control unit that controls an action of the drive unit, wherein
the control unit, in the case of reception of the setting signal to set the predetermined air-conditioning operation, controls the drive unit to perform the predetermined air-conditioning operation so that in the predetermined air-conditioning operation the room temperature will be the temperature within a temperature range, an upper limit of the temperature range being lower by a predetermined temperature than the upper-limit temperature, and a lower limit of the temperature range being higher by a predetermined temperature than the lower-limit temperature,
the household electric appliance further comprises a detecting unit that detects the room temperature within a room in which the appliance is installed and transmits results of the detection to the control unit,
the control unit, in the case of detection by the detecting unit, in the predetermined air-conditioning operation, that the room temperature is higher than the upper-limit temperature, causes the drive unit to perform a cooling operation so that the room temperature will be a first setting temperature, the first setting temperature is lower than the upper-limit temperature, a difference between the first setting temperature and the upper-limit temperature is the predetermined temperature, and
the control unit, in the case of detection by the detecting unit, in the predetermined air-conditioning operation, that the room temperature is lower than the lower-limit temperature, causes the drive unit to perform a heating operation so that the room temperature will be a second setting temperature, the second setting temperature is higher than the lower-limit temperature, a difference between the second setting temperature and the lower-limit temperature is the predetermined temperature.

2. A household electric appliance comprising:
a receiving unit that receives a setting signal to set a predetermined air-conditioning operation with an upper-limit temperature and a lower-limit temperature of a room temperature set;
a drive unit that drives an object to be driven to regulate the room temperature;
a control unit that controls an action of the drive unit; and
a detecting unit that detects the room temperature within a room in which the appliance is installed and transmits results of the detection to the control unit, wherein
the control unit, in the case of reception of the setting signal to set the predetermined air-conditioning operation, controls the drive unit to perform the predetermined air-conditioning operation so that in the predetermined air-conditioning operation the room temperature will be the temperature within a temperature range, an upper limit of the temperature range being lower by a predetermined temperature than the upper-limit temperature, and a lower limit of the temperature range being higher by a predetermined temperature than the lower-limit temperature, and the control unit, in the predetermined air-conditioning operation, controls the drive unit so that the room temperature will be a first setting temperature, the first setting temperature is lower than the upper-limit temperature, a difference between the first setting temperature and the upper-limit temperature is the predetermined temperature when an operation mode of the appliance based on the setting signal is a cooling operation, and controls the drive unit so that the room temperature will be a second setting temperature, the second setting temperature is higher than the lower-limit temperature, a difference between the second setting temperature and the lower-limit temperature is the predetermined temperature when the operation mode of the appliance based on the setting signal is a heating operation.

3. The household electric appliance of claim 2, wherein the control unit, in the case of the predetermined air-conditioning operation being set based on the setting signal during the operation of the appliance, controls so that the operation mode in which the appliance is operating will be continued and, as to the setting temperature, the operation will be performed according to the upper-limit temperature and the lower-limit temperature set with respect to the predetermined air-conditioning operation.

4. The household electric appliance of claim 3, wherein the receiving unit receives the setting signal to set the predetermined air-conditioning operation from a mobile terminal.

5. A household electric system comprising:
the household electric appliance of claim 4; and
the mobile terminal that transmits the setting signal to set the predetermined air-conditioning operation.

* * * * *